United States Patent

Matsuo et al.

[11] Patent Number: 6,167,566
[45] Date of Patent: Dec. 26, 2000

[54] VARIABLE RETRIEVING APPARATUS AND METHOD AND COMPUTER READABLE RECORDING MEDIUM RECORDING VARIABLE RETRIEVING PROGRAM THEREIN

[75] Inventors: Akihiko Matsuo; Keiko Kawabe; Minako Kimura; Kenji Nagahashi, all of Kawasaki, Japan

[73] Assignee: Fujitsu Limited, Kawasaki, Japan

[21] Appl. No.: 09/158,079

[22] Filed: Sep. 22, 1998

[30] Foreign Application Priority Data

May 15, 1998 [JP] Japan .................................. 10-132970

[51] Int. Cl.⁷ ...................................................... G06F 9/45
[52] U.S. Cl. ....................................................... 717/8
[58] Field of Search ................... 717/8, 1, 5, 2, 717/4

[56] References Cited

U.S. PATENT DOCUMENTS

| | | | |
|---|---|---|---|
| 5,033,009 | 7/1991 | Dubnoff | 707/503 |
| 5,291,587 | 3/1994 | Kodosky et al. | 395/500 |
| 5,442,780 | 8/1995 | Takanashi et al. | 707/1 |
| 5,555,412 | 9/1996 | Besaw et al. | 717/8 |
| 5,586,323 | 12/1996 | Koizumi et al. | 707/5 |
| 5,642,512 | 6/1997 | Tanaka et al. | 707/5 |
| 5,721,924 | 2/1998 | Kitadate | 717/3 |
| 5,740,033 | 4/1998 | Wassick et al. | 364/149 |
| 5,940,289 | 8/1999 | Iwata et al. | 707/2 |
| 6,006,251 | 12/1999 | Toyouchi et al. | 709/203 |
| 6,041,177 | 3/2000 | Kawabe et al. | 717/4 |

OTHER PUBLICATIONS

TITLE: Mibulator, IBM Technical Disclosure Bulletin, Sep. 1995, US.

TITLE: Graphical User Interface Design of the Imply Panel in LAN Server Specialist, IBM Technical Disclosure Bulletin, Mar. 1995, US.

*Primary Examiner*—Tariq R. Hafiz
*Assistant Examiner*—Chameli C. Das
*Attorney, Agent, or Firm*—Staas & Halsey LLP

[57] ABSTRACT

A variable retrieving unit refers to variable relation information and variable definition information held in an analysis result storing unit and retrieves variables which directly relate to a variable designated by a retrieval designating unit. A display unit displays a variable retrieval result by the variable retrieving unit in a form such that the variable retrieval result can be used for designation for re-retrieval by the retrieval designating unit.

26 Claims, 33 Drawing Sheets

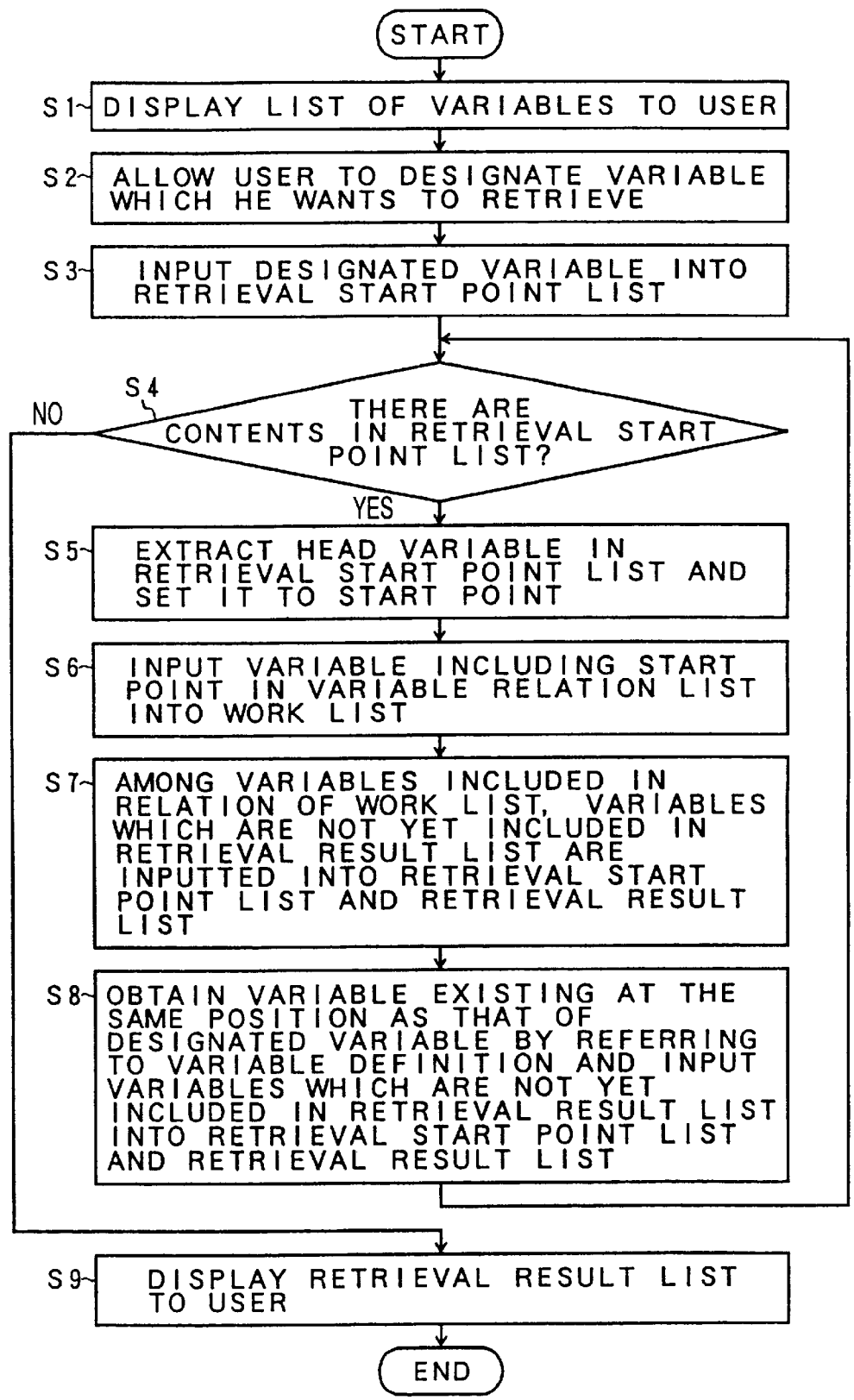

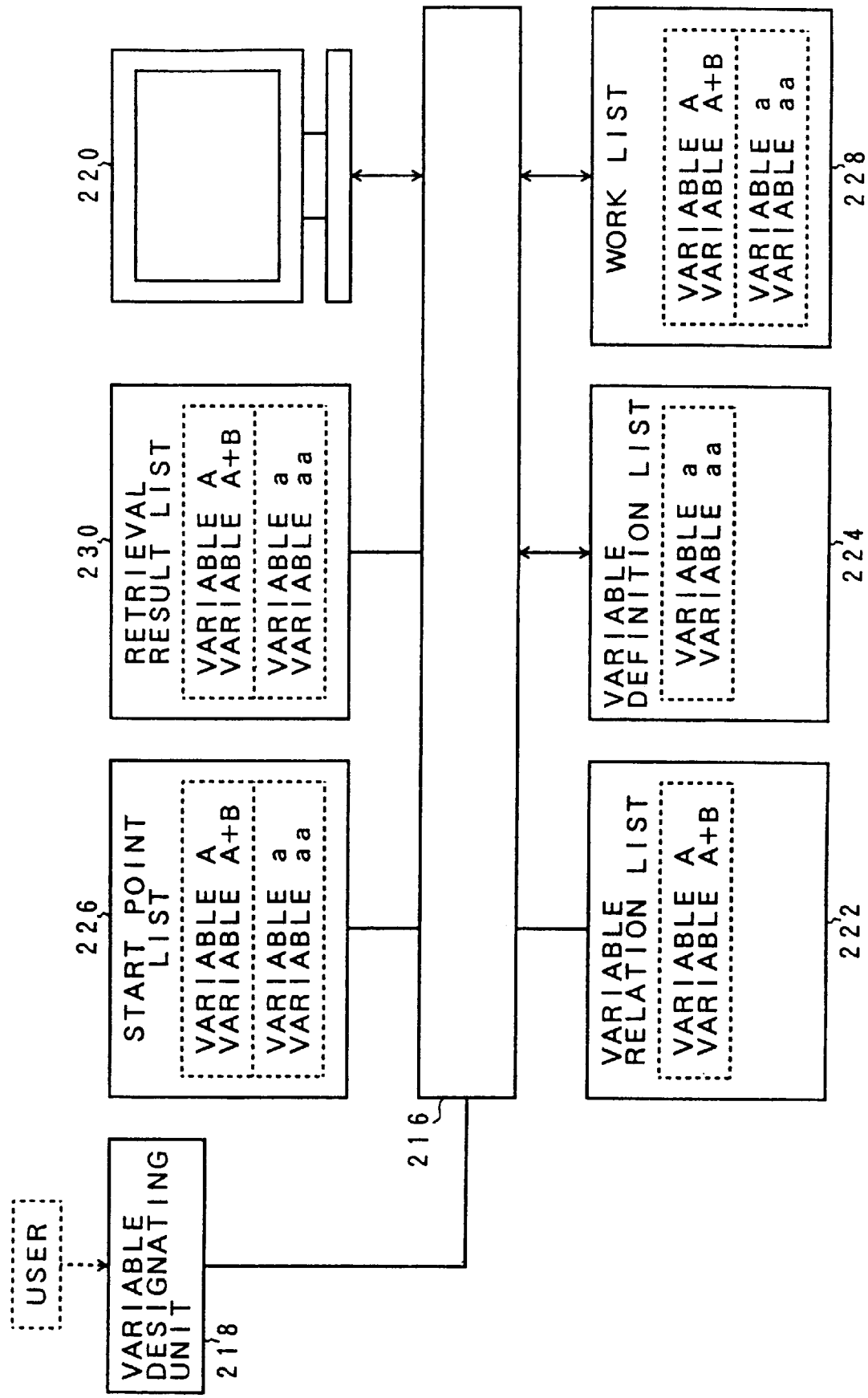

FIG. 6A

```
07  DATA DIVISION.
08  FILE SECTION.
09  FD SALES MASTER
10  01 SALES MASTER RECORD
11     03 PROCESSING DATE.
12        05 PROCESSING YEAR        PIC 9(02).
13        05 PROCESSING MONTH       PIC 9(02).
14        05 PROCESSING DAY         PIC 9(02).
15        03 SALES RECEIVING DATE   PIC 9(06).
16        03 SALES BRANCH CODE      PIC X(04).
17        03 ERROR CODE REDEFINES SALES BRANCH CODE.
18        03 SALES ARTICLE CODE     PIC X(04).
19        03 SALES ARTICLE QUANTITY PIC X(04).
20        03 SALES MONEY AMOUNT     PIC X(04).
21  01 SALES INFORMATION RECORD.
22        03 FILLER                 PIC X(03).
23  FD PRINT DATA.
24  01 SALES WRITING RECORD.
25  SPECIFICATION LINE.
26        03 FILLER                 PIC X(03).
27        03 BRANCH CODE            PIC X(04).
28  WORKING-STORAGE SECTION.
```

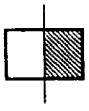

FIG. 6B

```
29  01 WORK AREA.
30     03 TARGET BRANCH CODE        PIC 9(04).
31     03 TARGET DATE               PIC 9(06).
32     03 END OF SALES MASTER       PIC 9
33                                  VALUE ZERO.
34  01 TARGET DATE.
35     03 TARGET YEAR               PIC 9(02).
36     03 TARGET MONTH              PIC 9(02).
37     03 TARGET DAY                PIC 9(02).
38  PROCEDURE DIVISION.
39     ACCEPT SALES BRANCH CODE FROM CONSOLE.
40     CALL'ZENGETSU UGING TARGET DATE.
41
42     IF SALES BRANCH CODE = TARGET BRANCH CODE
43        IF PROCESSING MONTH > TARGET MONTH
44           MOVE SALES BRANCH CODE TO BRANCH CODE
45           ERITE SPECIFICATION LINE.
46        MOVE SALES MASTER RECORD TO SALES WRITING RECORD
47        WRITE SALES WRITING RECORD
48        END-IF
49     END-IF.
50     READ SALES MASTER
51        AT END
52           MOVE 1 TO SALES MASTER
53     END-READ.
```

FIG. 9A

| RELATION SOURCE | TARGET BRANCH CODE |
|---|---|
| RELATION DESTINATION | SALES BRANCH CODE |
| RELATION TYPE | COMPARISON |

| RELATION SOURCE | TARGET BRANCH CODE |
|---|---|
| RELATION DESTINATION | WORK AREA |
| RELATION TYPE | MASTER/SLAVE RELATION |

| RELATION SOURCE | SALES BRANCH CODE |
| RELATION DESTINATION | CONSOLE |
| RELATION TYPE | TRANSFER |

FIG. 10B 22-22

| RELATION SOURCE | SALES BRANCH CODE |
| RELATION DESTINATION | TARGET BRANCH CODE |
| RELATION TYPE | COMPARISON |

FIG. 10C 22-23

| RELATION SOURCE | SALES BRANCH CODE |
| RELATION DESTINATION | BRANCH CODE |
| RELATION TYPE | TRANSFER |

FIG. 10D 22-24

| RELATION SOURCE | SALES BRANCH CODE |
| RELATION DESTINATION | ERROR CODE |
| RELATION TYPE | RE-DEFINITION |

FIG. 11

| RELATION SOURCE | TARGET YEAR |
|---|---|
| RELATION DESTINATION | PROCESSING YEAR |
| RELATION TYPE | CALCULATING EQUATION (TARGET YEAR = PROCESSING YEAR + 3) |

| 52 RELATION SOURCE | PROCESSING MONTH |
|---|---|
| 54 RELATION DESTINATION | TARGET MONTH |
| 56 RELATION TYPE | COMPARISON |
| 58 CAUSE SOURCE LINE | ZENGETSU. COB 30 LINE |

| RETRIEVAL ITEM NAME | RETRIEVAL VARIABLE | VARIABLE RELATION | SOURCE LINE |
|---|---|---|---|
| TARGET BRANCH CODE | SALES BRANCH CODE (IF SENTENCE) | COMPARISON | 36 |
| | WORK AREA | MASTER/SLAVE RELATION | 23 |

FIG.13B 28-2

| RETRIEVAL ITEM NAME | RETRIEVAL VARIABLE | VARIABLE RELATION | SOURCE LINE |
|---|---|---|---|
| SALES BRANCH CODE | CONSOLE (ACCEPT COMPONENT) | MASTER/SLAVE RELATION | 33 |
| | TARGET BRANCH CODE (IF SENTENCE) | COMPARISON | 36 |
| | BRANCH CODE (MOVE COMPONENT) | TRANSFER | 38 |
| | ERROR CODE (REDEFINE) | RE-DEFINITION | 11 |
| | SALES MASTER RECORD | MASTER/SLAVE RELATION | 04 |

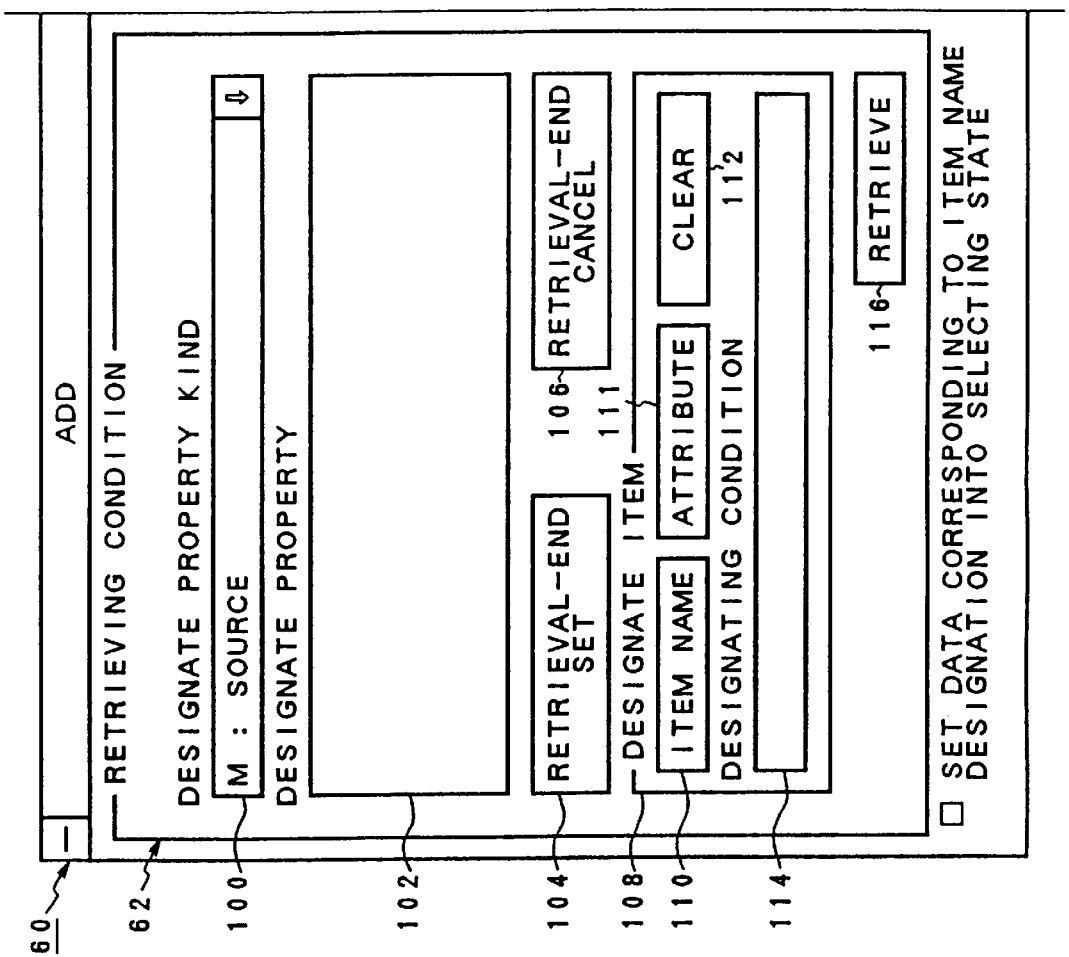
FIG. 14A

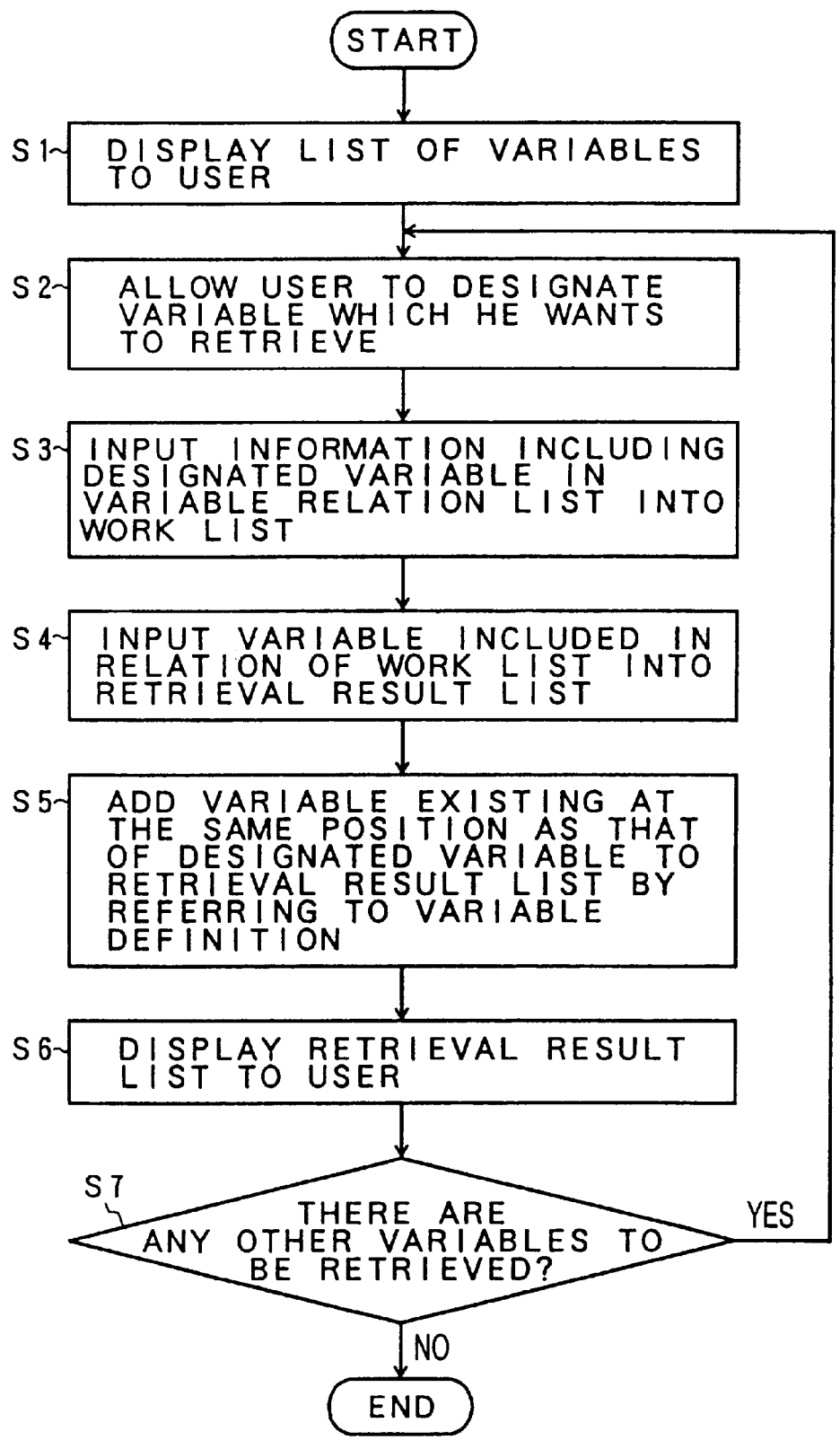

FIG. 16A

```
RWB/2000 EDITOR - zengetsu.cob
FILE (F)  EDIT (E)  INSERT (I)  TOOL (T)  DISPLAY (V)  HELP (H)

000120        SALES ARTICLE QUANTITY       PIC 9(02).
000130        SALES MONEY AMOUNT           PIC 9(08).
000140    01 SALES INFORMATION RECORD.
000150    FD PRINT DATA.
000160    01 SALE WRITING RECORD.
000170      03 FILLER                      PIC X(30).
000180    01 SPECIFICATION LINE.
000190      03 BRANCH CODE                 PIC X(30).
000200    WORKING-STORAGE SECTION.
000210    01 WORK AREA.
000220      03 BRANCH CODE                 PIC X(04).
000230      03 TARGET DATE                 PIC X(04).
000240      03 END OF SALES MASTER         PIC 9(06).
000250                                     PIC 9
000260                                     VALUE ZERO.
000270    01 TARGET DATE.
000280      03 TARGET YEAR                 PIC 9(02).
000290      03 TARGET MONTH                PIC 9(02).
000300      03 TARGET DAY                  PIC 9(02).
000310    PROCEDURE DIVISION.
000320    ACCEPT SALES BRANCH CODE FROM CONSOLE.
000330    CALL 'ZENGETSU' USING TARGET DATE.
```

FIG. 19A

| RETRIEVAL VARIABLE NAME | PARTIAL COINCIDENCE VARIABLE NAME | |
|---|---|---|
| BRANCH CODE | SALES BRANCH CODE | |
| | TARGET BRANCH CODE | |
| ... | ... | |

| RETRIEVAL VARIABLE NAME | SIMILAR VARIABLE NAME | | | | | | |
|---|---|---|---|---|---|---|---|
| A | AA | Aa | AaaA | a | | | |
| B | | | | | BB | Bb | b | bbb |
| ... | | | | | | | |

| 88 — VARIABLE RELATION TYPE | CONFIDENCE DEGREE — 90 |
|---|---|
| MASTER/SLAVE RELATION | 70% |
| RE-DEFINITION | 20% |
| TRANSFER | 100% |
| COMPARISON | 70% |
| CALCULATING EQUATION | 50% |

| 52 — RELATION SOURCE | SALES MASTER RECORD |
|---|---|
| 54 — RELATION DESTINATION | PROCESSING DATE |
| 56 — RELATION TYPE | MASTER/SLAVE RELATION |
| 90 — CONFIDENCE DEGREE | 70% |

22-51

F I G. 2 7
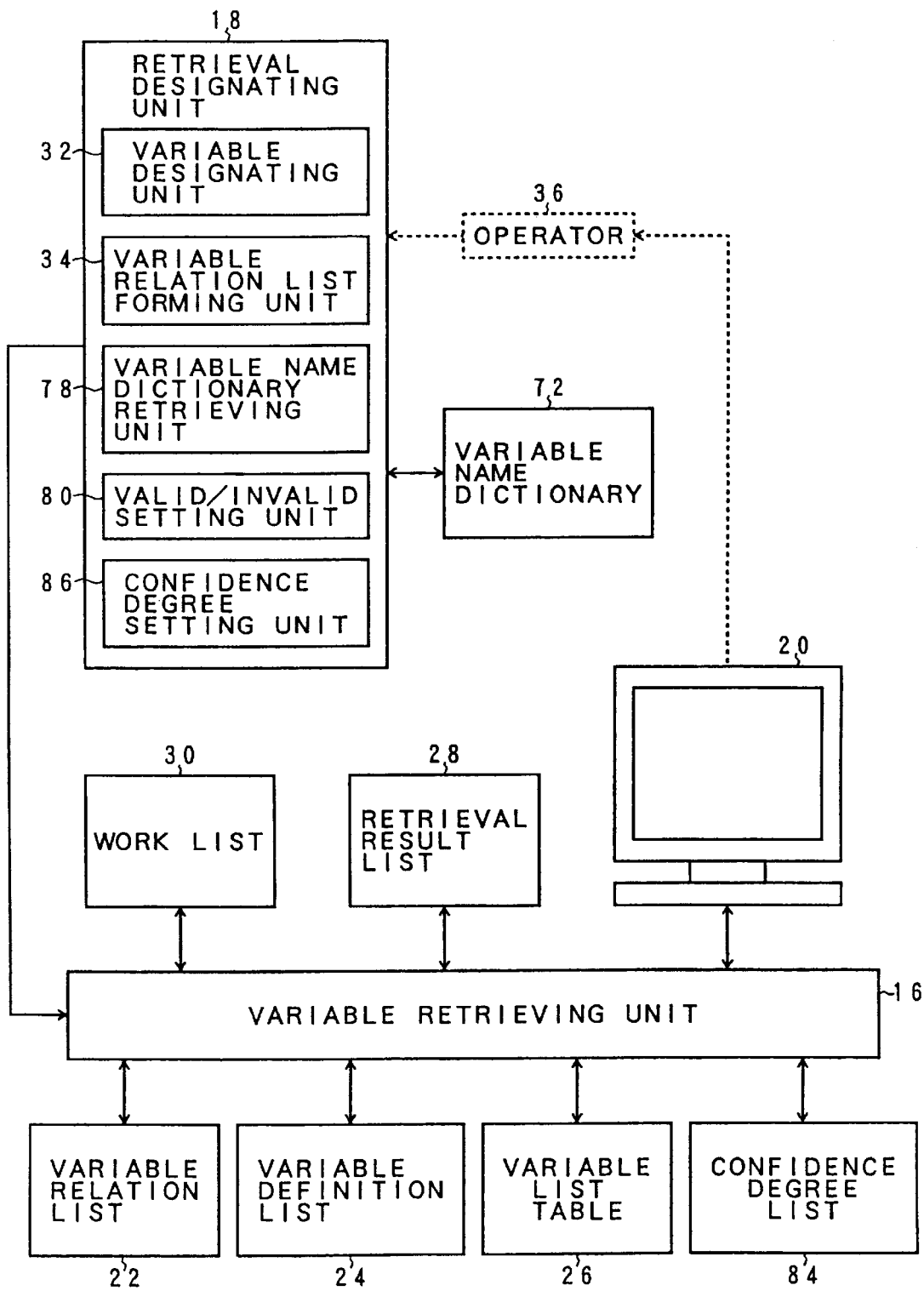

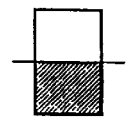
FIG. 30B
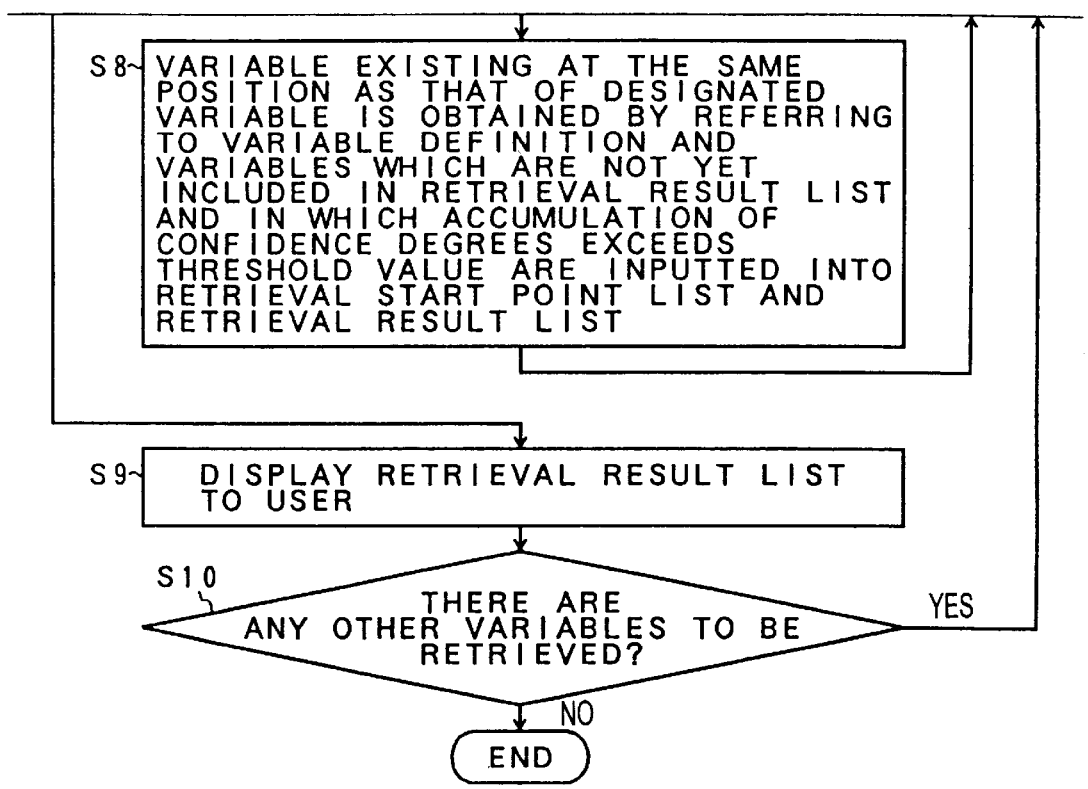

VARIABLE RETRIEVING APPARATUS AND METHOD AND COMPUTER READABLE RECORDING MEDIUM RECORDING VARIABLE RETRIEVING PROGRAM THEREIN

BACKGROUND OF THE INVENTION

1. Field of the Invention

The present invention relates to variable retrieving apparatus and method for retrieving and classifying a specific kind of variable which is necessary when a source program is corrected. More particularly, the invention relates to variable retrieving apparatus and method which can retrieve a variable by narrowing down to variables which directly relate to a correction of a specific variable.

2. Description of the Related Arts

In recent years, a specification change and a function addition by correcting a part of an existing program have been being widely executed. For such a correction of the existing program, it is important that the operation of the existing program can be promptly understood and a fact that there is no harmful side effect in association with the change can be easily confirmed. Generally, however, the program is often accompanied with only insufficient reference materials, so that a variable retrieving apparatus which can retrieve a variable having the same kind of value as that of data to which attention is paid and confirm a using location is desired as a supporting tool.

Among variable retrieving apparatuses we are using at present, there is an apparatus having a function for analyzing a substitution relation among variables in a source program and automatically retrieving a variable which is influenced by the variable to which attention is paid. By the variable automatic retrieving function, when a variable concerning a specific kind of data is retrieved and dealing of the data is changed, a location having a possibility to be influenced can be known.

FIG. 1 shows a variable retrieving apparatus we are using. A source program as a target of analysis has been stored in a source program storing unit 210. A program syntax analyzing unit 212 analyzes the source program, forms variable definition information included in the source program and variable relation information indicative of the relation of variables in the source program, and stores them as a variable relation list 222 and a variable definition list 224 into a repository 214 functioning as an information storing unit. A variable retrieving unit 216 retrieves a variable which is influenced by a variable designated from a retrieval designating unit 218 by an operation input of the user (operator) with reference to the variable relation list 222 and variable definition list 224 in the repository 214 and displays a retrieval result onto a display unit.

FIG. 2 is a flowchart for a variable retrieving process in FIG. 1 and this process will be described hereinbelow with reference to a functional block diagram of FIG. 3. First, in step S1, a list table of variables obtained as an analysis result of the source program is displayed to the user. In step S2, the user is allowed to designate a variable which he wants to retrieve. The variable designated by the user is notified from the retrieval designating unit 218 to the variable retrieving unit 216 in FIG. 3 and is registered, for example, as a variable A in a retrieval start point list 226. In step S4, whether a variable exists in the retrieval start point list 226 or not is checked. Since there are contents, the processing routine advances to step S5 and the variable at the head of the variable start point list 226, that is, the designated variable A is first taken out and is used as a start point. In step S6, a related variable (A+B) including the designated variable A as a start point is retrieved with reference to the variable relation list 222 and is inputted into a work list 228. Among variables included in the work list 228, variables which are not yet included in a retrieval result list 230, for example, the variable (A+B) retrieved this time is inputted to each of the retrieval start point list 226 and retrieval result list 230. In step S7, variables (a) and (aa) existing at the same position (the same layer position on the program) as that of the designated variable A presently serving as a start point are obtained with reference to the variable definition list 224 and are inputted to the work list 228. After that, the variables (a) and (aa) which are not included in the retrieval result list 230 are inputted to each of the retrieval start point list and the retrieval result list.

The processing routine is returned from step S4 to step S5, the next variable (A+B) is taken out, and the same process is repeated by using the variable (A+B) as a new start point. When there is no variable which is not yet retrieved in the retrieval start point list 226 in step S5, the processing routine advances to step S9, and the retrieval result list 230 is displayed to the user.

In such a variable retrieving apparatus, however, since all of the variables which are indirectly related to the designated variable as well as the variables which are directly related to the designated variable are retrieved from the designated variables and are outputted, the retrieval result of the variables concerning the designated variable is enormous. In case of correcting a certain variable in the source program, it is difficult to confirm the variables which are related to the variable to be corrected from the retrieval result. When another kind of variable which does not exert an influence even if the variable is corrected is retrieved, the user needs to perform the retrieval again by designating so as not to retrieve unnecessary variables. Since the variable retrieval is again executed from the beginning, however, there is a case where it takes time for the retrieval of one time depending on a source program and an efficiency of a variable retrieving work that is executed as a preliminary work of the source program correction deteriorates.

SUMMARY OF THE INVENTION

According to the invention, there is provided a variable retrieving apparatus of a computer program for retrieving a variable step by step in an interactive manner with the user so that an unnecessary variable is not included in a retrieval result, thereby making it easy to confirm the variable at the time of correction of a source program.

A variable retrieving apparatus of the invention comprises a syntax analyzing unit, an analysis result storing unit, a variable retrieving unit, a retrieval designating unit, and a display unit. The syntax analyzing unit analyzes a syntax of a source program. The analysis result storing unit holds variable relation information showing the relation among variables in the program and variable definition information which are obtained as an analysis result of the syntax analyzing unit. The retrieval designating unit designates a variable as a retrieval target on the basis of an operation input of the user. The variable retrieving unit refers to a variable relation list (variable relation information) and a variable definition list (variable definition information) held in the analysis result storing unit and retrieves variables which are directly related to the variable designated by the retrieval designating unit. The display unit displays the variable retrieval result by the variable retrieving unit in a format which can be used for designation for re-retrieval by the retrieval designating unit. In such a variable retrieving apparatus of the invention, the retrieval performed in a lump by an apparatus which is presently used is executed step by step in an interactive manner with the user. When a different kind of variable is retrieved, it is excluded at the site and the retrieval can be continued. Consequently, as for the retrieval result, only the variables which are directly related to the designated variable are displayed as a retrieval result, thereby enabling a work amount regarding the confirmation and correction of the retrieval result upon correction of the source program to be largely reduced.

The variable retrieving unit retrieves variables including the designated variable in either a relation source or a relation destination with reference to the variable relation list and stores them into the retrieval result. The variable retrieving unit also retrieves a variable such as a re-defined sentence or the like existing at the same position as that of the designated variable with reference to the variable definition list and stores it into the retrieval result. The display unit displays the retrieval result of the variables which are directly related to the designated variable retrieved by the variable retrieving unit as a list table having a layer structure corresponding to the source program onto a picture plane. By selecting an arbitrary variable in the list table on the picture plane, the retrieval designating unit is allowed to designate a variable for re-retrieval.

The variable retrieving apparatus of the invention further comprises: a variable name dictionary in which the relation of variable names has been preliminarily registered; and a variable name dictionary retrieving unit for retrieving a variable which is directly related with reference to the variable name dictionary according to the variable designated by the retrieval designating unit and storing it into the retrieval result. The variable name dictionary has a partial coincidence variable name dictionary in which partial coincidence variables which partially coincide with the variable name have been registered and a similar variable name dictionary in which variable names similar to the variable name have been registered. In this case, the variable name dictionary retrieving unit retrieves a variable name which partially coincides with or is similar to the designated variable name with reference to the partial coincidence variable name dictionary and similar variable name dictionary according to the designated variable and stores them into the retrieval result. The retrieval designating unit has a variable relation information forming unit. By the inputting operation of the user, the variable relation list showing the relation among the variables is formed and can be also held as a variable relation list of the analysis result storing unit. Consequently, both of the above units can arbitrarily set the variable relation except for the analysis result of the syntax analyzing unit in accordance with necessity. The retrieval designating unit has a valid/invalid designating unit for designating validity and invalidity of the variable relation as a retrieval target by using the list table of the variable retrieval result displayed on the display unit as a target. In this case, the variable retrieving unit excludes the variable relation designated as being invalid by the valid/invalid designating unit from the retrieval target. When an unnecessary variable is included in the list table of the retrieval result of the variables directly related to the designated variable, therefore, by setting "invalid" to the relation information with the variable, the user can exclude the unnecessary variable in the next re-retrieval. The analysis result storing unit holds row information of the source program which is the reason of the variable relation into the variable relation list formed by a program analysis by the syntax analyzing unit and allows the row information to be displayed together with the retrieval result onto the display unit. Consequently, the variable position can be easily confirmed when the source program is corrected on the basis of the retrieval result of the variables and the work efficiency can be raised. For example, when an arbitrary variable is selected on the source program displayed on the picture plane for the correcting operation of the source program, the display unit displays the position of the variable which is directly related to the selected variable onto the source program by a highlight display or the like on the basis of the row information of the source program added to the variable retrieval result.

The variable retrieving apparatus of the invention further registers confidence degree information indicative of a confidence degree of a relation kind included in the variable relation list stored in the analysis result storing unit. The variable retrieving unit stores the confidence degree obtained with reference to the confidence degree information into the retrieval result in addition to a retrieved variable. The display unit displays the confidence degree together with the retrieval result. The variable relation obtained as a variable retrieval result has different degrees of probability according to the kind of variable and can be expressed as an experience value within a range of, for example, 0% to 100% by using such a probability degree as a confidence degree. Since the confidence degree is displayed together with the variable of the retrieval result as mentioned above, with respect to a variable having a low confidence degree, the user confirms whether there is a relation between the variables or not with reference to the source program. When the confidence degree is high, the source program can be corrected by using the retrieval result as it is. Thus, the variable retrieval result can be properly used. The set confidence degree of the variable relation can be changed individually by a confidence degree setting unit provided for the retrieval designating unit in accordance with the inputting operation of the user.

According to another embodiment of the invention, there is provided a variable retrieving apparatus of what is called an automatic retrieval type in which an unnecessary variable is not included in a retrieval result by limiting a range of an automatic retrieval of variables related to the variable designated by the user by the confidence degree of the variable relation.

As an apparatus construction for this purpose, the variable retrieving unit retrieves a variable directly related to the designated variable designated by the operation input to the retrieval designating unit with reference to a variable relation list and a variable definition list held in an analysis result storing unit, retrieves a variable indirectly related to the designated variable by further regarding the variable obtained as a retrieval result as a designated variable, accumulates a confidence degree of the relation kind of the variable every retrieval of each variable, excludes the relevant variable from the retrieval result when an accumulation value of the confidence degrees is less than a predetermined threshold value, and stores the variable into the retrieval result when the accumulation value is equal to or larger than the threshold value. The variable retrieving unit multiplies the confidence degree of the relation kind of the variable which is expressed by a numerical value in a range from 1.0 to 0 every retrieval of each variable, excludes the variable from the retrieval result when the multiplication value is less than a predetermined threshold value, and stores the variable into the retrieval result when the multiplication value is equal to or larger than the threshold value. When such a confidence degree of the relation kind of the variable is multiplied, as the number of times of retrieval using the designated variable as a start point increases, the accumulation value of the confidence degrees decreases. Consequently, a variable in a series having a low confidence degree which is equal to or less than the threshold value can be excluded from the retrieval result, a large amount of retrieval result obtained by the conventional automatic retrieval can be limited to a range of valuable variables having a high confidence degree, and the retrieval result for correcting the source program can be easily confirmed.

According to the invention, there is provided a variable retrieving method of a computer program for retrieving a variable step by step in an interactive manner with the user so that an unnecessary variable is not included in a retrieval result, thereby making it easy to confirm the variable at the time of correction of a source program. The variable retrieving method comprises:

a syntax analyzing step of analyzing a syntax of a source program;

an analysis result storing step of holding a variable relation list indicative of the relation among variables in a program obtained as an analysis result of the syntax analyzing step and a variable definition list;

a retrieval designating step of designating a variable as a retrieval target on the basis of an operation input of the user;

a variable retrieving step of retrieving a variable directly related to the variable designated in the retrieval designating step with reference to the variable relation list and the variable definition list held in the analysis result storing step; and a retrieval display step of displaying a variable retrieval result by the variable retrieving step in a format which can be used for designation for re-retrieval by the retrieval designating step.

The details of the variable retrieving method of the interactive retrieval type are substantially the same as those in the case of the apparatus.

According to another embodiment of the invention, a variable retrieving method whereby a range of an automatic retrieval of a variable related to a variable designated by the user is limited by a confidence degree of the variable relation, thereby preventing that an unnecessary variable is included in a retrieval result is provided. The variable retrieving method of the automatic retrieval type comprises:

a syntax analyzing step of analyzing a syntax of a source program;

an analysis result storing step of holding a variable relation list indicative of the relation among variables in a program obtained as an analysis result in the syntax analyzing step and a variable definition list;

a retrieval designating step of designating a variable as a retrieval target on the basis of an operation input;

a variable retrieving step of retrieving a variable directly related to the designation variable designated by the operation input in the retrieval designating step with reference to the variable relation list and the variable definition list held in the analysis result storing step, retrieving a variable indirectly related to the designated variable by further regarding a variable obtained as a retrieval result as a designation variable, accumulating a confidence degree (multiplication of the confidence degree) of a relation kind of the variable every retrieval of each variable, excluding the relevant variable from the retrieval result when an accumulation value of the confidence degrees is less than a predetermined threshold value, and storing the variable into the retrieval result when the accumulation value is equal to or larger than the threshold value; and a retrieval displaying step of displaying the variable retrieval result in the variable retrieving step.

Further, according to the invention, a recording medium in which a variable retrieval program has been recorded and which can be read by a computer is provided. In case of an interactive retrieval type, the recording medium records a variable retrieval program comprising: a retrieval designating module for designating a variable as a retrieval target on the basis of an operation input; a variable retrieving module for retrieving a variable directly related to the variable designated by the retrieval designating module with reference to variable relation information indicative of the relation among variables in a program obtained as an analysis result of a source program syntax and variable definition information; and a retrieval display module for displaying the variable retrieval result in the variable retrieval module in a format which can be used for designation for a re-retrieval by the retrieval designating module.

In case of a recording medium in which a variable retrieval program of an automatic retrieval type has been recorded and which can be read by a computer, the variable retrieval program comprises: a retrieval designating module for designating a variable as a retrieval target on the basis of an operation input; a variable retrieving module for retrieving a variable directly related to the designated variable designated by an operation input to the retrieval designating module with reference to variable relation information indicative of the relation among variables in a program obtained as a result of the syntax analysis of the source program and variable definition information by referring to the variable relation information and variable definition information held in an analysis result storing module, retrieving a variable indirectly related to the designated variable by further regarding a variable obtained as a retrieval result as a designation variable, accumulating a confidence degree (multiplication value of the confidence degree) of a relation kind of a variable every retrieval of each variable, excluding the relevant variable from the retrieval result when the accumulation value of the confidence degree is less than a predetermined threshold value, and storing the variable into the retrieval result when the accumulation value is equal to or larger than the threshold value; and a retrieval display module for displaying the variable retrieval result by the variable retrieving module.

The details in the recording medium are also substantially the same as those in the case of the apparatus.

The above and other objects, features, and advantages of the present invention will become more apparent from the following detailed description with reference to the drawings.

BRIEF DESCRIPTION OF THE DRAWINGS

FIG. 2 is a flowchart for an automatic variable retrieving process of the apparatus of FIG. 1;

FIG. 3 is a functional block diagram of the apparatus of FIG. 1;

FIGS. 6A and 6B are explanatory diagrams of a source program as a target of a variable retrieval;

FIGS. 9A and 9B are explanatory diagrams of variable relation information including a variable "target branch code" obtained by an analysis of the source program of FIGS. 6A and 6B;

FIGS. 10A to 10D are explanatory diagrams of variable relation information including a variable "sales branch code" obtained by the analysis of the source program of FIGS. 6A and 6B;

FIG. 11 is an explanatory diagram of variable relation information serving as a relation type "calculating equation";

FIG. 12 is an explanatory diagram of variable relation information having a cause source line as program position information;

FIGS. 13A and 13B are explanatory diagrams of a retrieval result in the case where the variable "target branch code" is designated and a retrieval result in the case where the variable "sales branch code" is subsequently designated and a retrieval is again performed;

FIGS. 14A and 14B are explanatory diagrams of a retrieval operation screen displaying the retrieval results of FIGS. 13A and 13B;

FIG. 15 is a flowchart for the variable retrieving process according to FIGS. 6A and 6B;

FIGS. 16A and 16B are explanatory diagrams of a work screen to correct the source program by using the retrieval results of FIGS. 14A and 14B;

FIGS. 19A and 19B are explanatory diagrams of the variable name dictionary in FIG. 18;

FIGS. 26A and 26B are explanatory diagrams of the variable relation information to which a confidence degree list and confidence degrees are added and which is used in FIG. 25;

FIG. 27 is a functional block diagram of another embodiment of the invention having a variable relation list forming function, a variable name dictionary, a valid/invalid setting function, and a confidence degree setting function;

FIGS. 30A and 30B are flowcharts for the variable retrieving process in FIG. 28.

DETAILED DESCRIPTION OF THE PREFERRED EMBODIMENTS

Interactive Type Variable Retrieval

Figure 1:
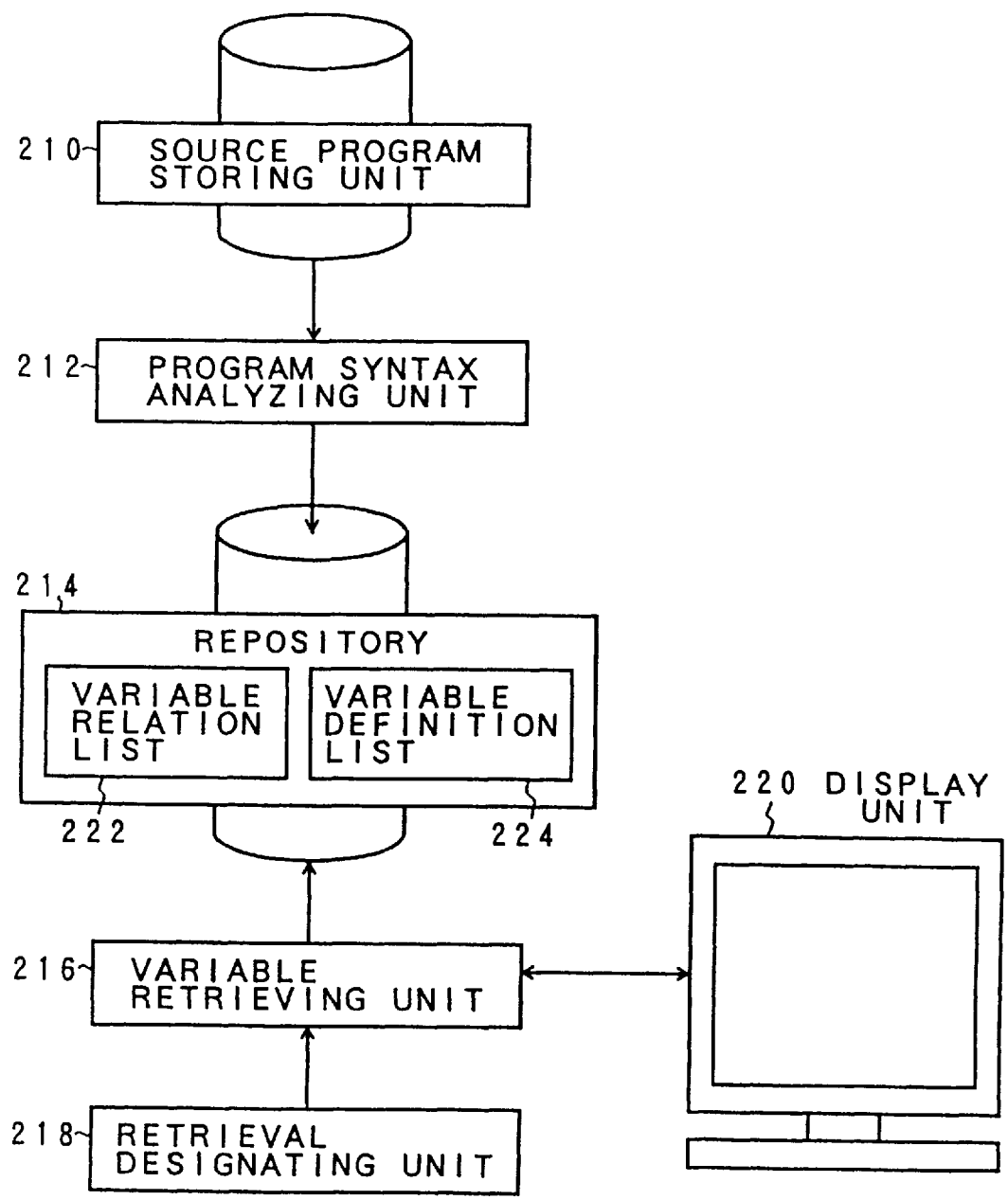
FIG. 1 is an explanatory diagram of a variable retrieving apparatus which is used at present by us.
Figure 4:
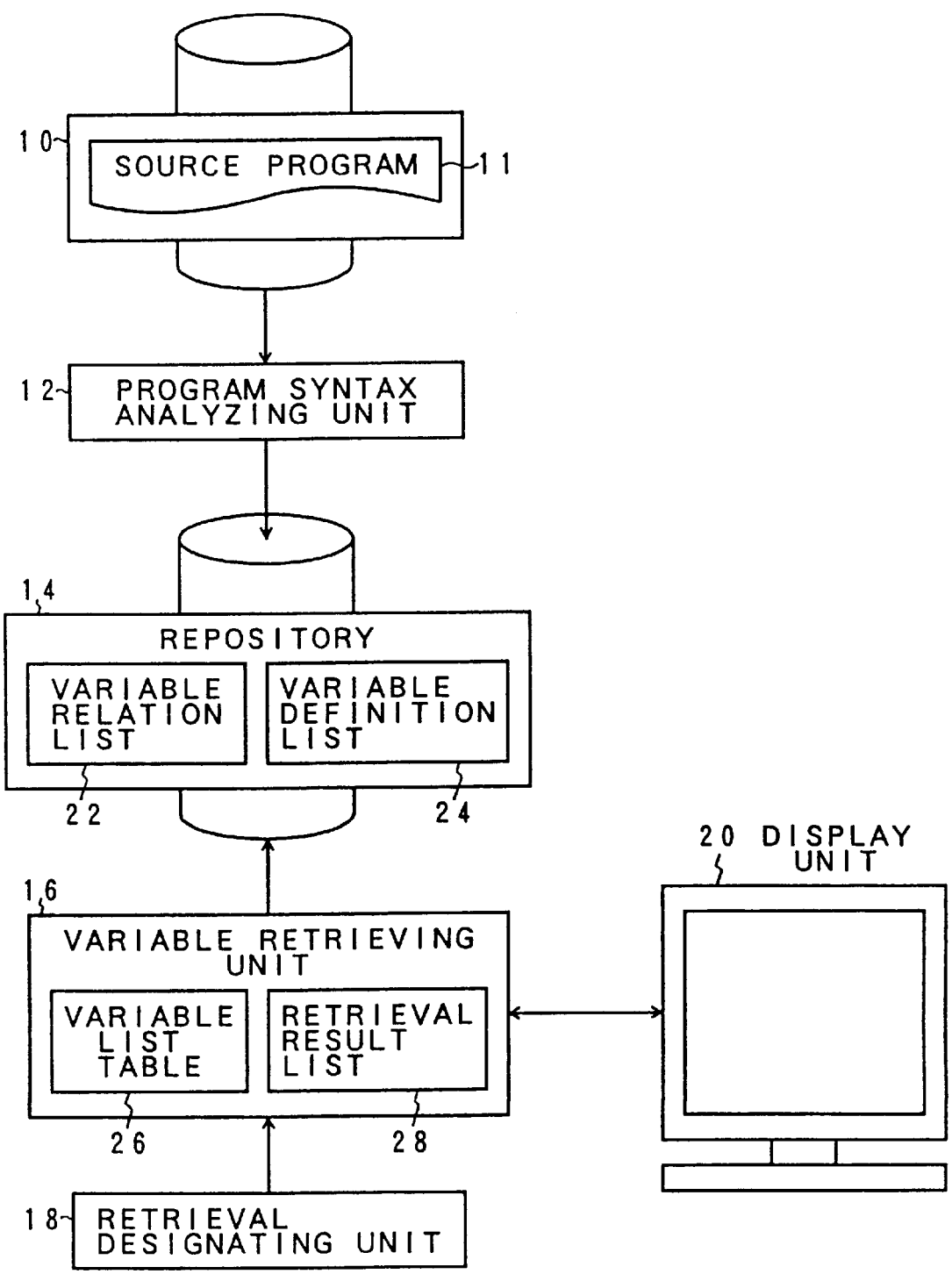
FIG. 4 is a block diagram of an apparatus construction of the invention.

FIG. 4 is an explanatory diagram of an apparatus construction of a variable retrieving apparatus according to the invention. The apparatus is characterized in that a variable retrieval is performed step by step in an interactive manner with the operator as a user. The interactive type variable retrieving apparatus is constructed by: a source program storing unit 10; a program syntax analyzing unit 12; a repository 14 serving as an analysis result storing unit; a variable retrieving unit 16; a retrieval designating unit 18; and a display unit 20. A source program 11 serving as a target of the variable retrieval has been stored in the source program storing unit 10. The program syntax analyzing unit 12 performs a syntax analysis for the source program 11, as a target, stored in the source program storing unit 10, forms variable definition information included in the source program 11 and information of a variable relation in the source program 11, and stores them as a variable relation list 22 and a variable definition list 24 into the repository 14. The variable retrieving unit 16 displays a list table of variables derived as an analysis result of the program syntax analyzing unit 12 onto the screen of the display unit 20. When the operator designates a variable as a retrieval target by the retrieval designating unit 18 by seeing the variable list table, the variable retrieving unit 16 retrieves variables which directly relate to the designated variable with reference to the variable relation list 22 and variable definition list 24 in the repository 14 based on the designated variable. A retrieval result is displayed by the display unit 20. In the display of the retrieval result on the display unit 20, it is displayed in a format such that a list of the retrieval results can be used as it is for variable designation of the re-retrieval.

Figure 5:
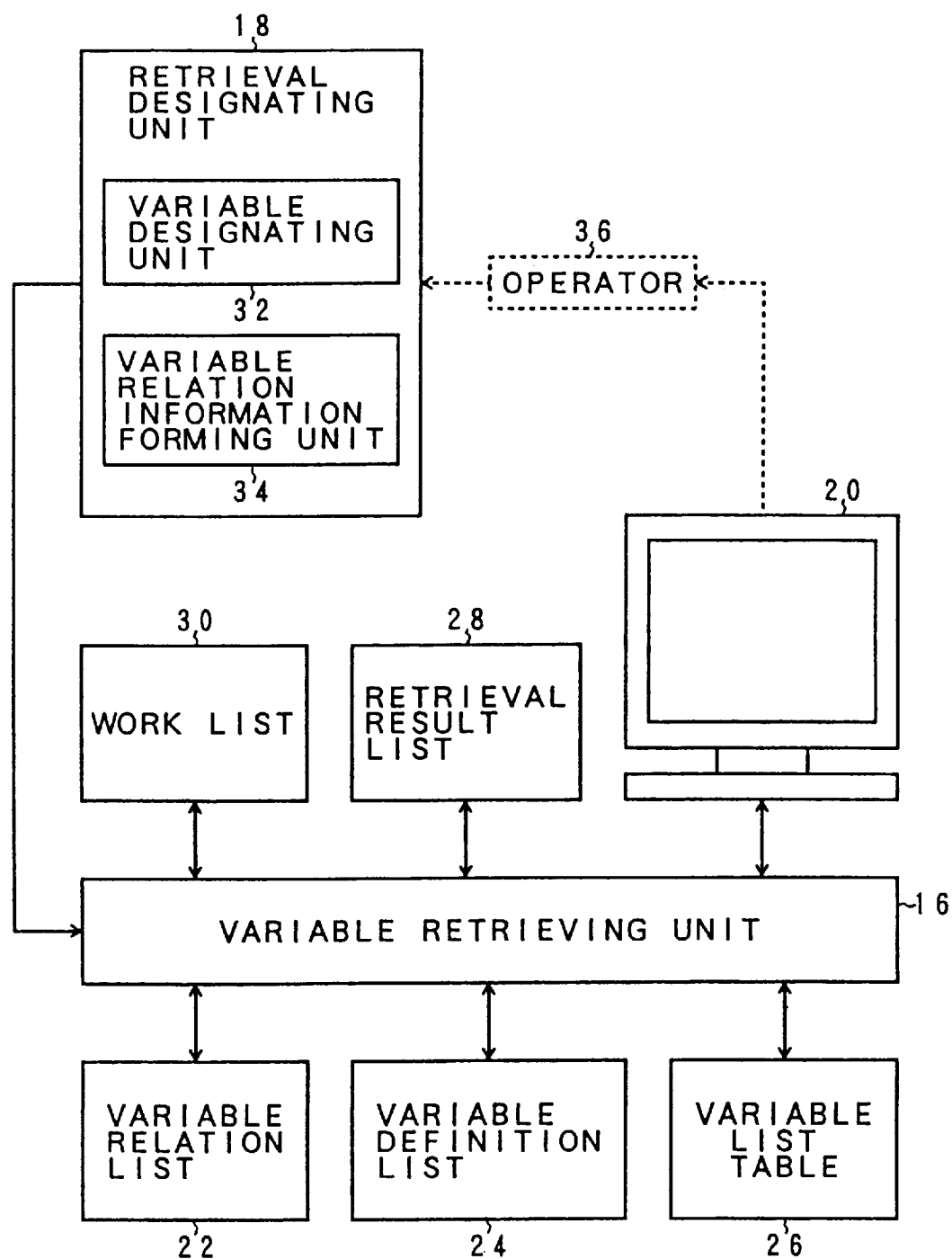
FIG. 5 is a functional block diagram of a variable retrieving process of the invention.

FIG. 5 is a functional block diagram of the interactive type variable retrieving apparatus of FIG. 4. First, the variable relation list 22, variable definition list 24, and further, a variable list table 26 which were obtained as analysis results of the source program 11 by the program syntax analyzing unit 12 in FIG. 4 and stored in the repository 14 are connected to the variable retrieving unit 16. A work list 30 which is used as a work list of the variable retrieval and a retrieval result list 28 to store the retrieval results are provided. The designation of a retrieval item by the variable retrieving unit 16 is performed by the retrieval designating unit 18. A variable designating unit 32 is provided for the retrieval designating unit 18. In a state where the contents of the variable list table 26 are displayed on the display unit 20, when an operator 36 performs a designating operation to designate an arbitrary variable name on the screen, on the basis of the designating operation, the variable designating unit 32 notifies the variable retrieving unit 16 of the designation variable name designated by the operator 36. The variable retrieving unit 16 first refers to the variable relation list 22, refers to a plurality of variable relation information stored in the variable relation list 22, and retrieves another variable which directly relates to the designated variable. Specifically speaking, the variable relation information in the variable relation list 22 is constructed by a relation source variable name, a relation destination variable name, and a relation type. The variable relation information in which the designated variable corresponds to the variable name of either the relation source or the relation destination is retrieved. The variable relation information retrieved with reference to the variable relation list 22 is stored into the work list 30. The variable which directly relates to the designated variable in the retrieved variable relation information is stored into the retrieval result list 28. When the variable retrieval by reference to the variable relation list 22 is finished, the variable retrieving unit 16 refers to the variable definition list 24, retrieves the variable existing at the same position on the source program as that of the designated variable, for example, the variable which is replaced at the same position by a re-definition sentence or the like, and likewise stores the retrieved variable into the retrieval result list 28 via the work list 30. When the variable retrieval of the first time based on the designated variable as mentioned above is finished, the variable retrieving unit 16 displays the contents in the retrieval result list 28 onto the display unit 20. The operator 36 sees a list table of the retrieval results on the display unit 20 and again designates an arbitrary variable name in the list table, thereby allowing the retrieval to be again executed. A retrieval result by the re-retrieval is stored in the retrieval result list 28 and a list table of the retrieval results as much as two times is displayed on the display unit 20. The operator 36 repeats the retrieval by the re-designation of the variable while looking at the list table of the retrieval results and retrieves another variable which relates to the first designated variable up to a range which is considered to be necessary. If another kind of variable which is not concerned with the first designated variable is obtained as a retrieval result on the display unit 20 by the repetition of the re-retrieval as mentioned above, since such a retrieval is unnecessary, the operator 36 cancels this retrieval result and can finish the retrieving process by the retrieval result so far.

FIGS. 6A and 6B show examples of the source program 11 as a variable retrieval target in FIG. 5. The source program 11 has a program name "ZENGETSU" and is described by the C language. Various variable names are used for the source program 11. For example, there is a variable name "sales master" of the third line and there is a variable name "sales master record" of the fourth line. As shown on the fifth line and the ninth to fourteenth lines, the variable name "sales master record" has variable names "processing date", "sales receiving date", "sales branch code", "error code", "sales article code", "sales article quantity", and "sales money amount" as slave variables. The variable name "processing date" of the fifth line also has variable names "processing name", "processing month", and "processing day" of the sixth to ninth lines as slave variables. In this example, although the variables have a layer structure of three stages like master, slave, and grandchild, the layer structure can be properly constructed as necessary.

Figure 7:
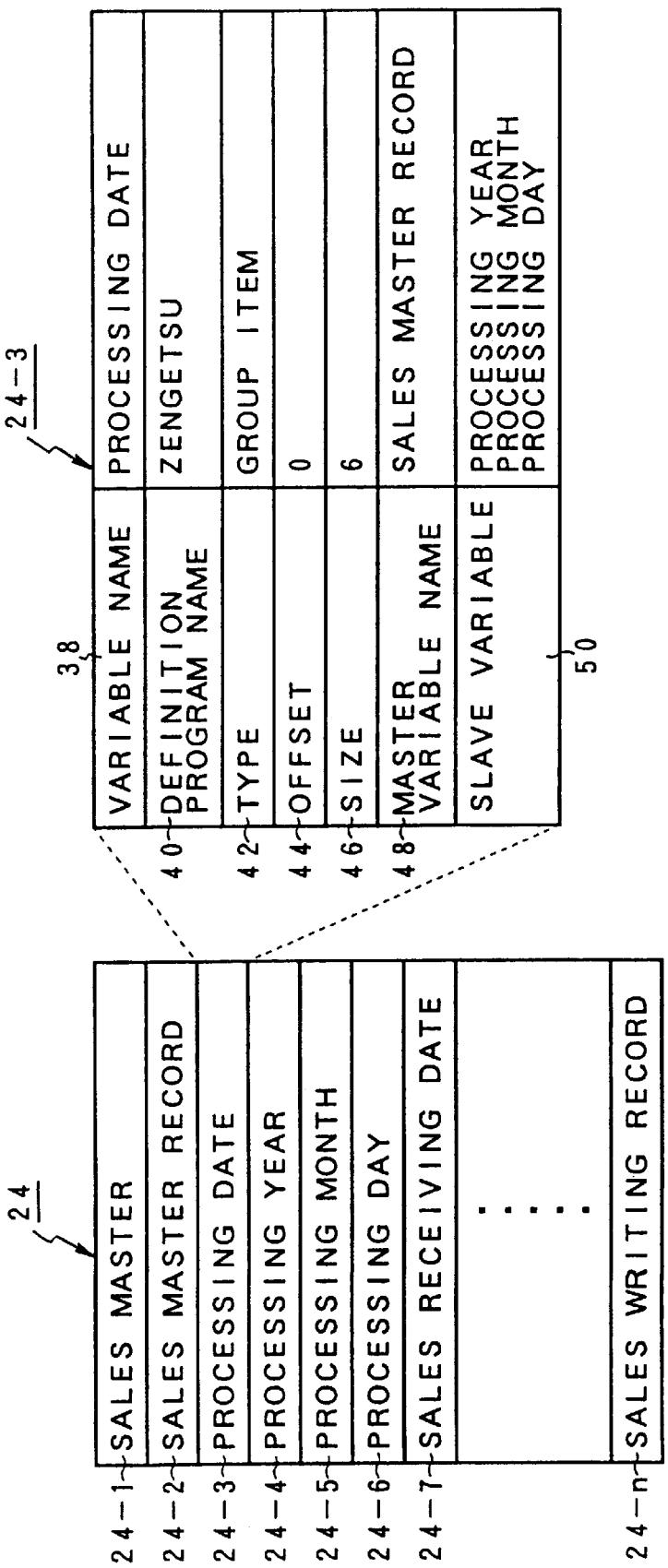
FIG. 7 is an explanatory diagram of a variable definition list in FIG. 5.

FIG. 7 is an explanatory diagram of the variable definition list 24 in which the variable definition information obtained from the result derived by analyzing the source program 11 in FIGS. 6A and 6B by the program syntax analyzing unit 12 in FIG. 4 has been stored. In the variable definition list 24, by the analysis of the source program 11 in FIGS. 6A and 6B, variable definition information 24-1 to 24-n showing variable names "sales master", "sales master record", . . . , and "sales writing record" have been stored. The variable definition information 24-1 to 24-n are as shown on the right side, for example, with respect to the variable definition information 24-3 of the variable name "processing date". The variable definition information 24-3 is constructed by respective definition information of a variable name 38, a definition program name 40, a type 42, an offset 44, a size 46, a master variable name 48, and a slave variable 50. In this case, the variable name 38 is "processing date", the definition program name 40 is "ZENGETSU", the type 42 is "group item", the offset 44 is 0, the size 46 is 6, the master variable name 48 is "sales master record", and further, the slave variable 50 is "processing year", "processing month", and "processing day".

Figure 8:
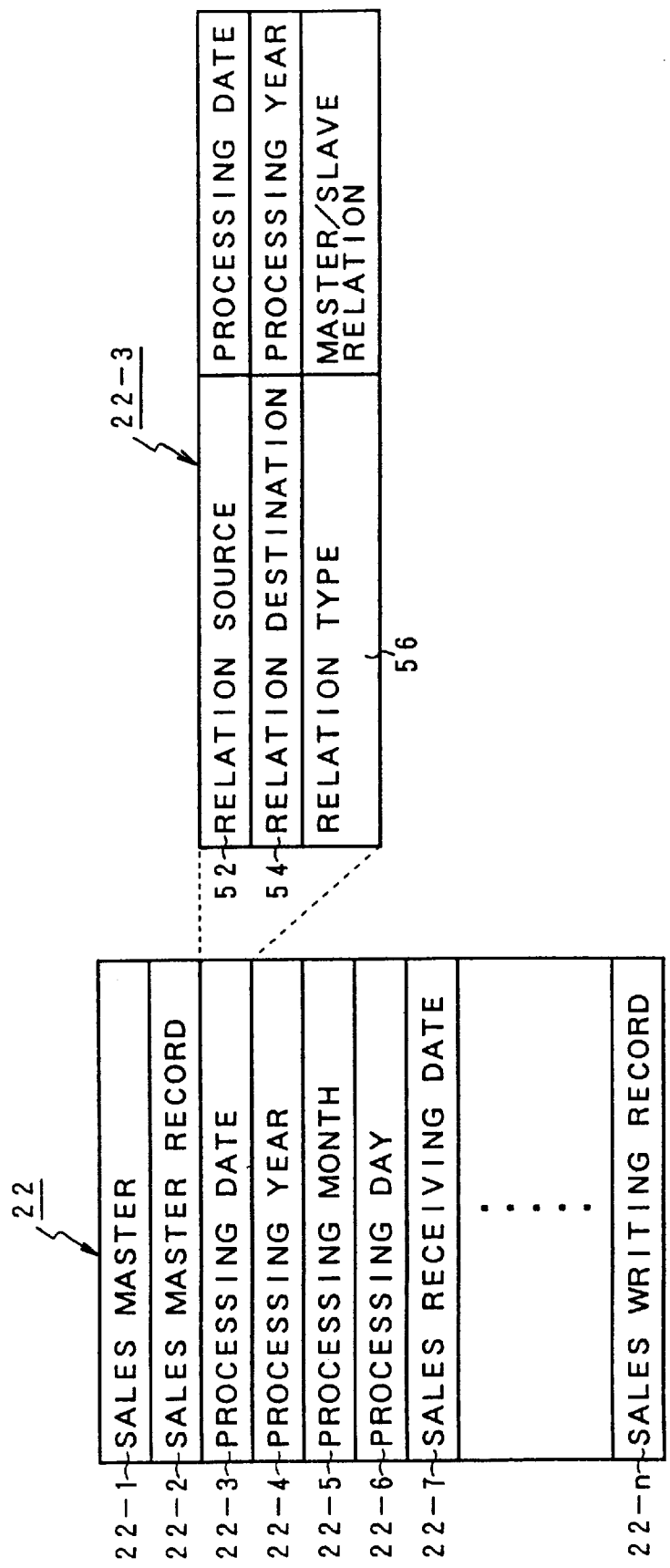
FIG. 8 is an explanatory diagram of a variable relation list in FIG. 5.

FIG. 8 is an explanatory diagram of the variable relation list 22 in which the variable relation information with respect to the source program 11 in FIGS. 6A and 6B obtained by the syntax analysis of the program syntax analyzing unit 12 in FIG. 4 has been stored. In the variable relation list 22, a plurality of variable relation information 22-1 to 22-n shown by variable names "sales master", "sales master record", . . . , "sales writing record" have been stored. The variable relation information 22-1 to 22-n have a structure shown on the right side with respect to, for example, the variable relation information 22-3 of the variable name "processing date". That is, the variable relation information 22-3 of the variable "processing date" is constructed by a relation source 52, a relation destination 54, and a relation type 56. In this case, a variable "processing date" is stored in the relation source 52, a variable "processing year" is stored in the relation destination 54, and further, "master/slave relation" is stored in the relation type 56. As relation types 56 which are used in the variable relation information, generally, there are the following types.

I. Master/slave relation
II. Comparison
III. Transfer
IV. Re-definition
V. Calculating equation If there are any other relation types, they can be also obviously decided as necessary.

FIGS. 9A and 9B show variable relation information in case of paying attention to a variable name "target branch code" of the 24th line of the source program 11 in FIGS. 6A and 6B. In this case, two variable relation information 22-11 and 22-12 in FIGS. 9A and 9B are formed by the syntax analysis of the source program 11. In FIG. 9A, the relation source is a variable "target branch code", the relation destination is a variable "sales branch code", and the relation type is "comparison". In the variable relation information 22-12 of FIG. 9B, the relation source is a variable "target branch code", the relation destination is a variable "work area", and the relation type is "master/slave relation". The variable relations 22-1 to 22-12 in FIGS. 9A and 9B are referred by the variable retrieval in which the operator 36 has designated the variable "target branch code" in the retrieval designating unit 18 in FIG. 5. As variables which directly relate to the designated variable, the variable "sales branch code" of the variable relation information 22-11 and the variable "work area" of the variable relation information 22-12 are obtained as retrieval results.

FIGS. 10A to 10D show variable relation information obtained by the syntax analysis of the source program 11 in FIGS. 6A and 6B which is referred when the variable "sales branch code" in variable relation information 22-11 and 22-12 in FIGS. 9A and 9B is again designated and the retrieval is again performed with respect to the retrieval results obtained by referring to the variable relation information 22-11 and 22-12. That is, four kinds of variable relation information 22-21, 22-22, 22-23, and 22-24 shown in FIGS. 10A to 10D are referred by the re-designated variable "sales branch code". Thus, variables "CONSOLE", "branch target code", "branch code", and "error code" are obtained as retrieval results and their relation types are "transfer", "comparison", "transfer", and "re-definition", respectively.

FIG. 11 shows variable relation information 22-31 of a relation type "calculating equation" which is stored in the variable relation list 22 in FIG. 5. Although the variable relation information 22-31 is not obtained from the analysis result of the source program 11 in FIGS. 6A and 6B, for example, in the case where an arithmetic operation relation such that (target year=processing year+3) is defined between the variable "target year" and the variable "processing year" by a proper source program, the variable relation information 22-31 in which the relation type is set to "calculating equation" as shown in FIG. 11 is formed.

FIG. 12 shows another embodiment of the variable relation information which is stored into the variable relation list 22 in FIG. 5. The embodiment is characterized in that information of a sentence in the source program which becomes a reason of the variable relation is held and, when the retrieval result is displayed, the position in the source program can be displayed to the operator on the basis of an instruction such as an attribute display or the like. In such variable relation information 22-41, in addition to the relation source 52, relation destination 54, and relation type 56, a cause source line 58 is newly provided. Information showing "(program name)+(program line)" is stored as a position in the source program 11 in FIGS. 6A and 6B of a variable "target month" of the relation destination 54 for a variable "processing month" of the relation source 52. For example, "ZENGETSU. COB36 lines" is stored.

FIGS. 13A and 13B show retrieval results in the case where the operator 36 designates the variable "sales branch code" in a state where the variable relation list 22 and variable definition list 24 are made by the syntax analysis from the source program 11 in FIGS. 6A and 6B for the variable retrieving unit 16 in FIG. 5. A retrieval result 28-1 of FIG. 13A relates to the case where the variable "target branch code" is designated as a retrieval item name. In this case, by referring to the variable relation information 22-11 and 22-12 in FIGS. 9A and 9B, as variables which directly relate to the designated variable, the variable "sales branch code" and the variable "work area" are obtained as retrieval results. Such variable relations of the retrieval results are "comparison" and "master/slave relation" and the source lines of the source program which became the cause are lines 36 and 23. A retrieval result 28-2 of FIG. 13B is a retrieval result in the case where with respect to a list display for the display unit 20 of the retrieval result of FIG. 13A, the user designates the variable "sales branch code" derived as a retrieval result on the screen and again executes the retrieval. The retrieval result 28-2 is obtained with reference to the variable relation information 22-21 to 22-24 in FIGS. 10A to 10D by the variable "sales branch code" in the retrieval result 28-1 of the first time in FIG. 13A. That is, as retrieval results, five variables "CONSOLE", "target branch code", "branch code", "error code", and "sales master record" are obtained. Their variable relations are "master/slave relation", "comparison", "transfer", "re-definition", and "master/slave relation", respectively. The cause source lines are lines 33, 36, 38, 11, and 4.

Figure 14B:
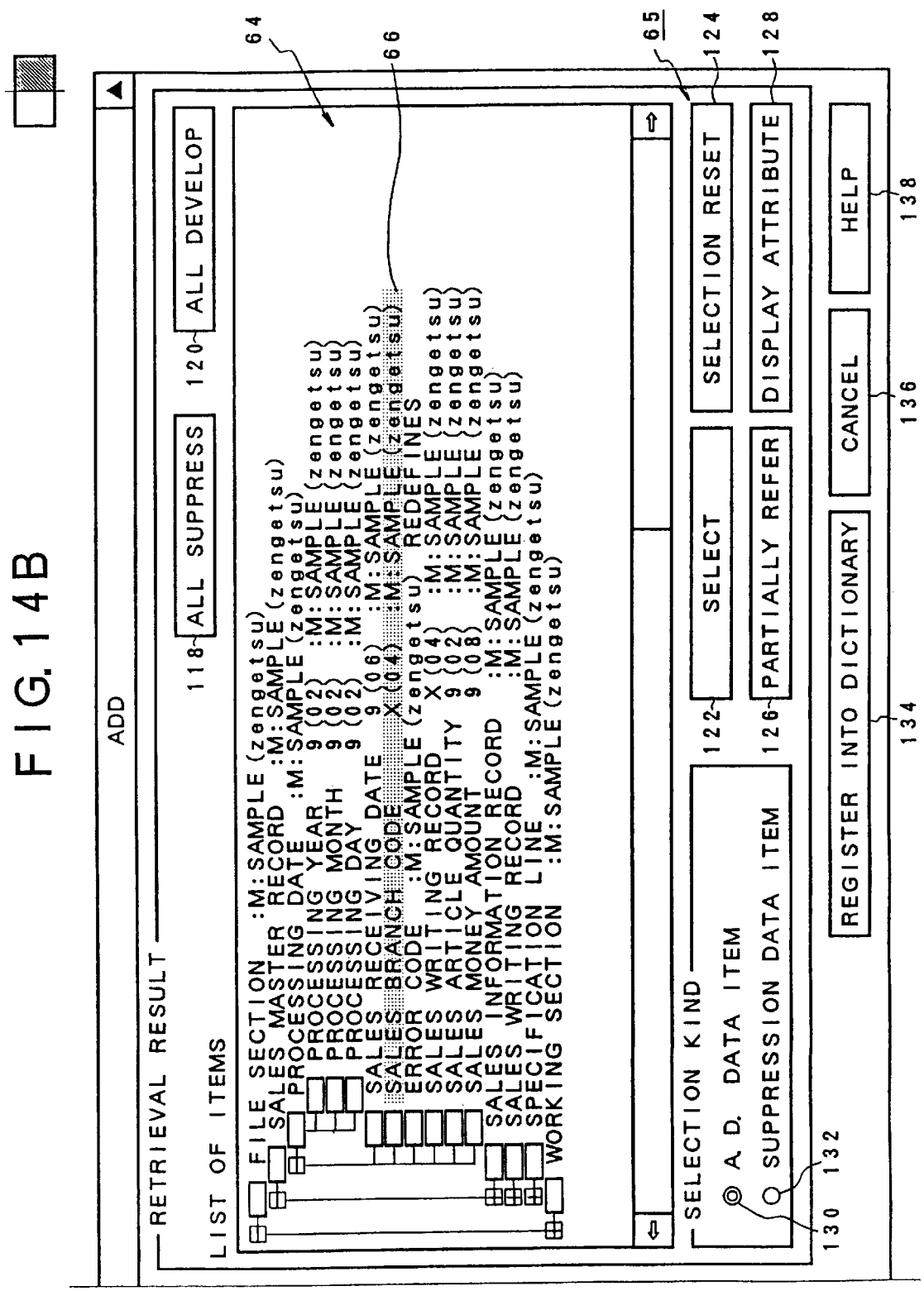

FIGS. 14A and 14B are explanatory diagrams of a variable retrieval work screen 60 which is displayed on the display unit 20 in FIG. 5. The variable retrieval work screen 60 is constructed by a retrieval designating unit 62 on the left side, a retrieval result display unit 64 on the right side, and a re-retrieval designating unit 65. A property kind designating unit 100 is provided in the top portion of the retrieval designating unit 62 on the left side. In this example, a property kind "source" is designated. Subsequently, a property designating unit 102 is provided and a source program name "ZENGETSU" is inputted therein. Subsequent to the property designating unit 102, a retrieval-end setting key 104 and a retrieval-end cancel key 106 are provided and a retrieval item designating unit 108 is arranged under those keys. An item name key 110 to designate a variable name, an attribute key 111 to set attribute information necessary for retrieval, a clear key 112, and a designating condition input unit 114 are provided in the retrieval item designating unit 108. A retrieval executing key 116 is arranged at the bottom position. In the retrieval result display unit 64 on the right side of the variable retrieval work screen 60, a suppression display key 118 and a development display key 120 to decide a display condition of the retrieval result are provided at the upper stage of the display screen. The suppression display key 118 suppresses a variable layer structure of the retrieval result display unit 64 to a specific layer and displays. On the other hand, the development display key 120 displays all of the layers of the variables as a retrieval result in a state where they are developed. Therefore, if the user wants to see the overall variable arrangement, the variables of the upper layers are displayed by selecting and operating the suppression display key 118. If the user wants to see the details, it is sufficient to display the variable layers up to the final layer by operating the development display key 120.

The contents comprising both the retrieval result 28-1 at the first time of FIG. 13A and the retrieval result 28-2 at the second time of FIG. 13B are displayed on the retrieval result display unit 64 by a layer structure corresponding to the positions of the variables of the source program in FIGS. 6A and 6B. The re-retrieval designating unit 65 is provided under the retrieval result display unit 64. A variable selecting key 122, a selection reset key 124, a partial reference key 126, an attribute display key 128, and further, selection kind check boxes 130 and 132 are arranged in the re-retrieval designating unit 65. As for the operation of the re-retrieval designating unit 65, a mouse cursor is positioned to the variable which needs to be re-retrieved, namely, for example, the variable "sales branch code" with respect to the variable displayed on the retrieval result display unit 64 and is clicked, so that an inversion display (shown in the diagram) is performed and the re-retrieval and the designated variable are determined. Subsequently, by moving the mouse to the variable selection key 122 of the re-retrieval designating unit 65 and clicking it, the selection variable "sales branch code" is validated. If the user wants to reset the selection, it is sufficient to merely mouse-click the selection reset key 124. A dictionary registering key 134, a cancel key 136, and a help key 138 are provided on the lower side of the re-retrieval designating unit 65. As will be clearly described hereinlater, as for the dictionary registering key 134, variable relations are previously registered in a dictionary, thereby enabling the variable relations to be retrieved with reference to the dictionary by the designated variable.

FIG. 15 is a flowchart for the retrieval processing operation of the interactive type variable retrieving apparatus in FIG. 4 based on the functional block diagram of FIG. 5. First in step S1, the variable retrieving unit 16 displays the variable list table 26 derived as a syntax analysis result of the source program onto the display unit 20. Specifically speaking, a list table of the variables is displayed on the retrieval result display unit 64 on the right side of the variable retrieval work screen 60 in FIGS. 14A and 14B in accordance with the layer structure of the variable position on the source program. When the list table cannot be displayed in the display area, all of the variables can be seen by scrolling the display area. In step S2, the user is allowed to designate a variable to be retrieved. Specifically speaking, the retrieval designating unit 62 in FIGS. 14A and 14B is used and an arbitrary variable name in the variable list table is designated by the item name key 110. When the user designates the variable name to be retrieved as mentioned above, in step S3, the variable retrieving unit refers to the variable relation list 22 and stores the variable relation information including the designated variable into the work list 30. In step S4, the variable corresponding to the designated variable in the variable relation information stored in the work list 30 is taken out and stored into the retrieval result list 28. In step S5, with reference to the variable definition list 24, the variable existing at the same layer position on the source program as that of the designated variable is taken out and is added to the retrieval result list 28. For example, in the source program 11 of FIGS. 6A and 6B, now it is assumed that the variable "sales branch code" of the 10th line has been designated in step S2, in step S5, the variable existing at the same position as that of the variable "error code" which was re-defined by "REDEFINES sentence" of the 11th line in FIGS. 6A and 6B is retrieved with reference to the variable definition list 24. The retrieved variable is added to the retrieval result list 28. The variable existing at the same position as that of the variable designated in step S5 can be said that the re-defined variable is a typical variable. When the retrieval result is obtained with reference to the variable definition information in step S5, the contents of the retrieval result list 28 are displayed to the user in step S6. The user refers to the retrieval results of the first time displayed on the display unit 20 in step S6. If there is further any other variable to be retrieved, the processing routine is returned to step S2 and the variable which the user wants to retrieve in the retrieval result list table is designated. By the designation, the retrieval results by the retrieval of the second time are obtained by the processes in steps S3 to S6 and are similarly displayed to the user by the display unit 20. The user repeats the retrieval designation and the display of the retrieval result as mentioned above. If the variable whose kind differs from that of the first designated variable is retrieved in the added portion by the new retrieval result, the retrieval result is cancelled, thereby finishing the retrieval on the basis of the retrieval results so far.

Figure 16B:
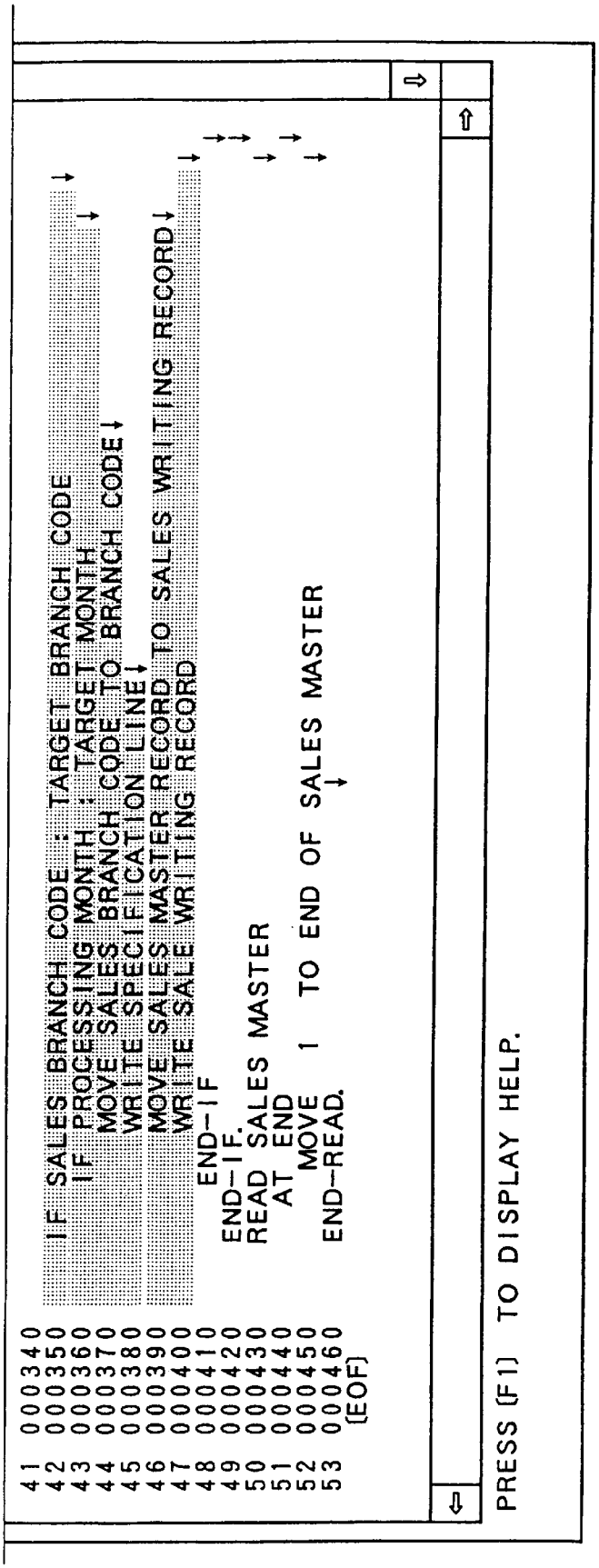

FIGS. 16A and 16B show work screens at the time of the correction of the source program using the retrieval results as a list table of the retrieval result display unit 64 in FIGS. 14A and 14B. In a source program correction work screen 68, when the variable "target branch code" of the 30th line which was first designated upon display of the retrieval results in FIGS. 14A and 14B is selected as a variable of a correction target by mouse clicking or the like, on the basis of the retrieval results of FIGS. 14A and 14B, the variable which directly relates to the variable "target branch code" is shown by a highlight display 70. It is shown that the variable displayed by the highlight display 70 needs to be checked.

Variable Name Dictionary

Figure 17:
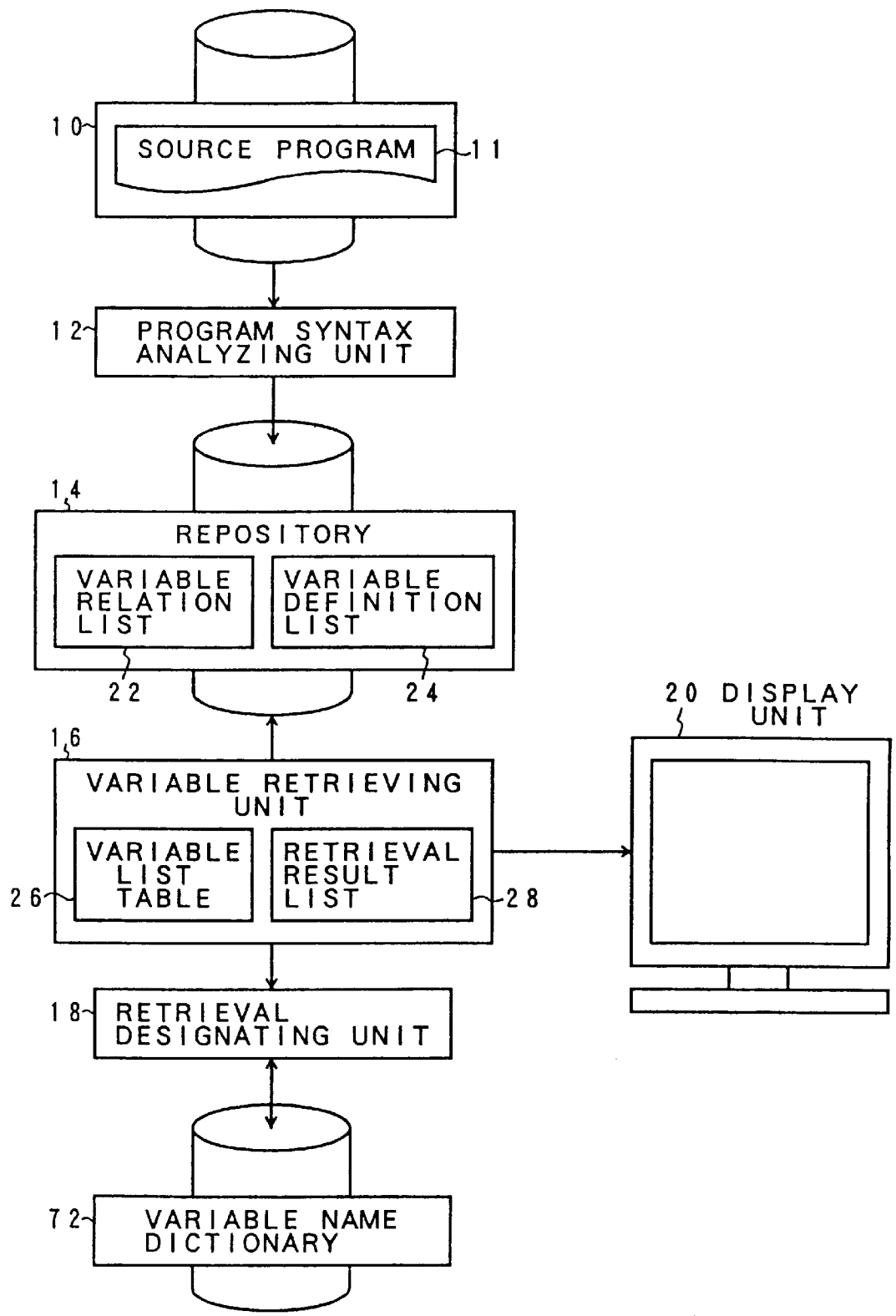
FIG. 17 is an explanatory diagram of another embodiment of the invention having a variable name conversion dictionary.

FIG. 17 shows another embodiment of an interactive type variable retrieving apparatus. The embodiment is characterized in that in addition to the variable relation list and the variable definition list obtained by the syntax analysis of the source program, the related variable is retrieved by using a variable name dictionary defining the variable relations. In this apparatus, although the source program storing unit 10, program syntax analyzing unit 12, repository 14 in which the variable relation list 22 and variable definition list 24 have been stored, variable retrieving unit 16, retrieval designating unit 18, and display unit 20 are the same as those in the embodiment of FIG. 4, a variable name dictionary 72 is newly provided besides them.

Figure 18:
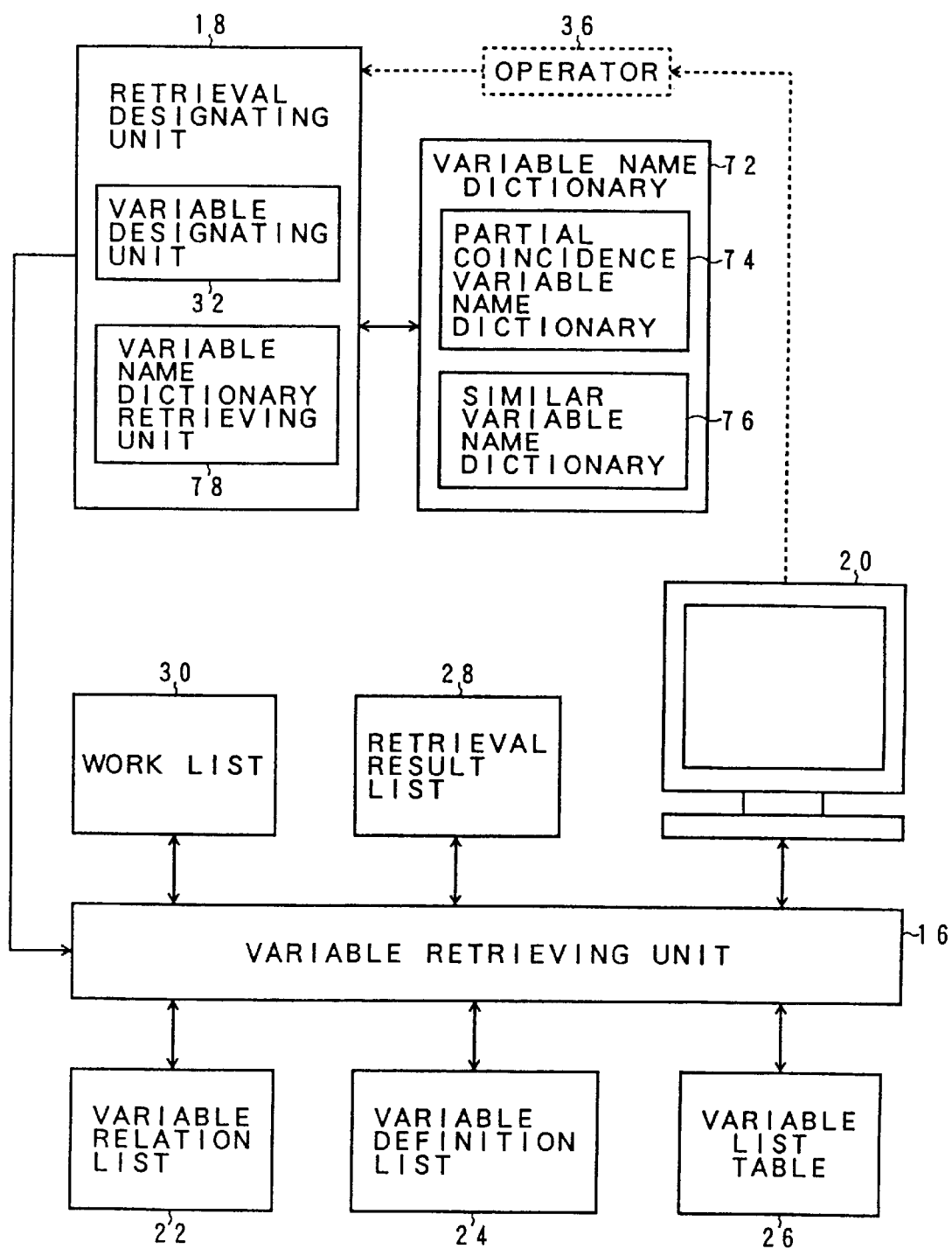
FIG. 18 is a functional block diagram of the embodiment of FIG. 17.

FIG. 18 is a functional block diagram of FIG. 17. The variable name dictionary 72 is provided for the retrieval designating unit 18. A partial coincidence variable name dictionary 74 and a similar variable name dictionary 76 are provided in the variable name dictionary 72. In correspondence to the variable name dictionary 72, a variable name dictionary retrieving unit 78 is provided for the retrieval designating unit 18. Even if the variable name dictionary retrieving unit 78 can be also similarly provided as a function of the variable retrieving unit 16 instead of the function of the retrieval designating unit 18.

FIGS. 19A and 19B show the details of the partial coincidence variable name dictionary 74 and similar variable name dictionary 76 in FIG. 18. FIG. 19A shows the partial coincidence variable name dictionary 74. A retrieval variable name which is designated by the operator 36 and a variable name which partially coincides therewith have been registered in the dictionary 74. For example, with respect to the variable name "branch code", "sales branch code" and "target branch code" have been registered as partial coincidence variable names. FIG. 19B shows the similar variable name dictionary 76 and predetermined similar variable names have been registered in correspondence to the retrieval variable name which is designated by the operator 36. For example, for a retrieval variable name A designated by the operator, AA, Aa, AaaA, and a have been registered as similar variable names.

Figure 20:
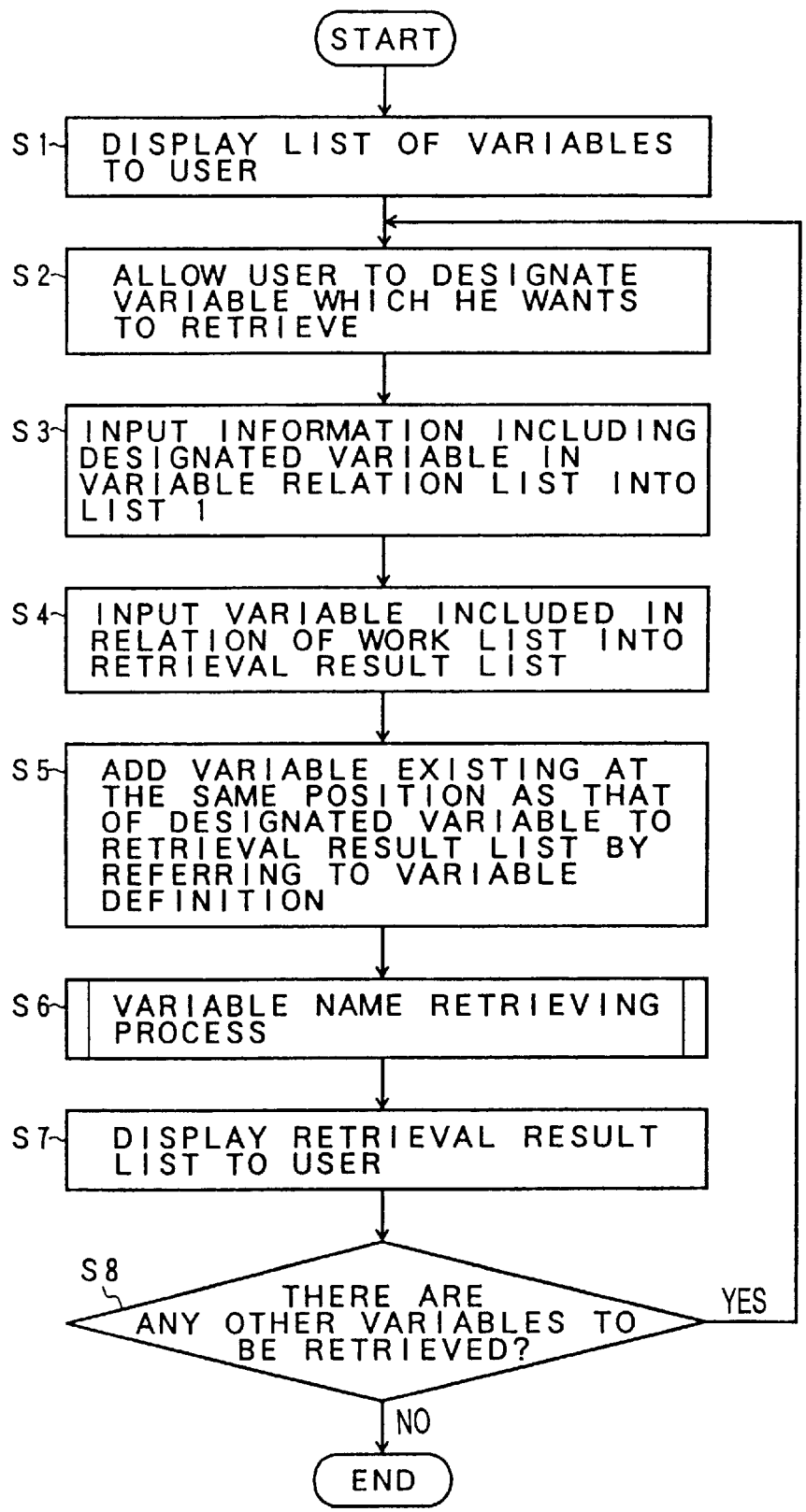
FIG. 20 is a flowchart for a variable retrieving process according to the embodiment of FIG. 18 using the variable name dictionary.

FIG. 20 is a flowchart for the variable retrieving process in the embodiment having the variable name dictionary 72 in FIG. 18. The variable retrieval by the reference to the variable relation list 22 based on the variable designated by the user and the reference to the variable definition list 24 in steps S1 to S5 is substantially the same as that in the embodiment of FIG. 15. Besides it, in case of using the variable name dictionary, a variable name retrieving process is executed in step S6.

Figure 21:
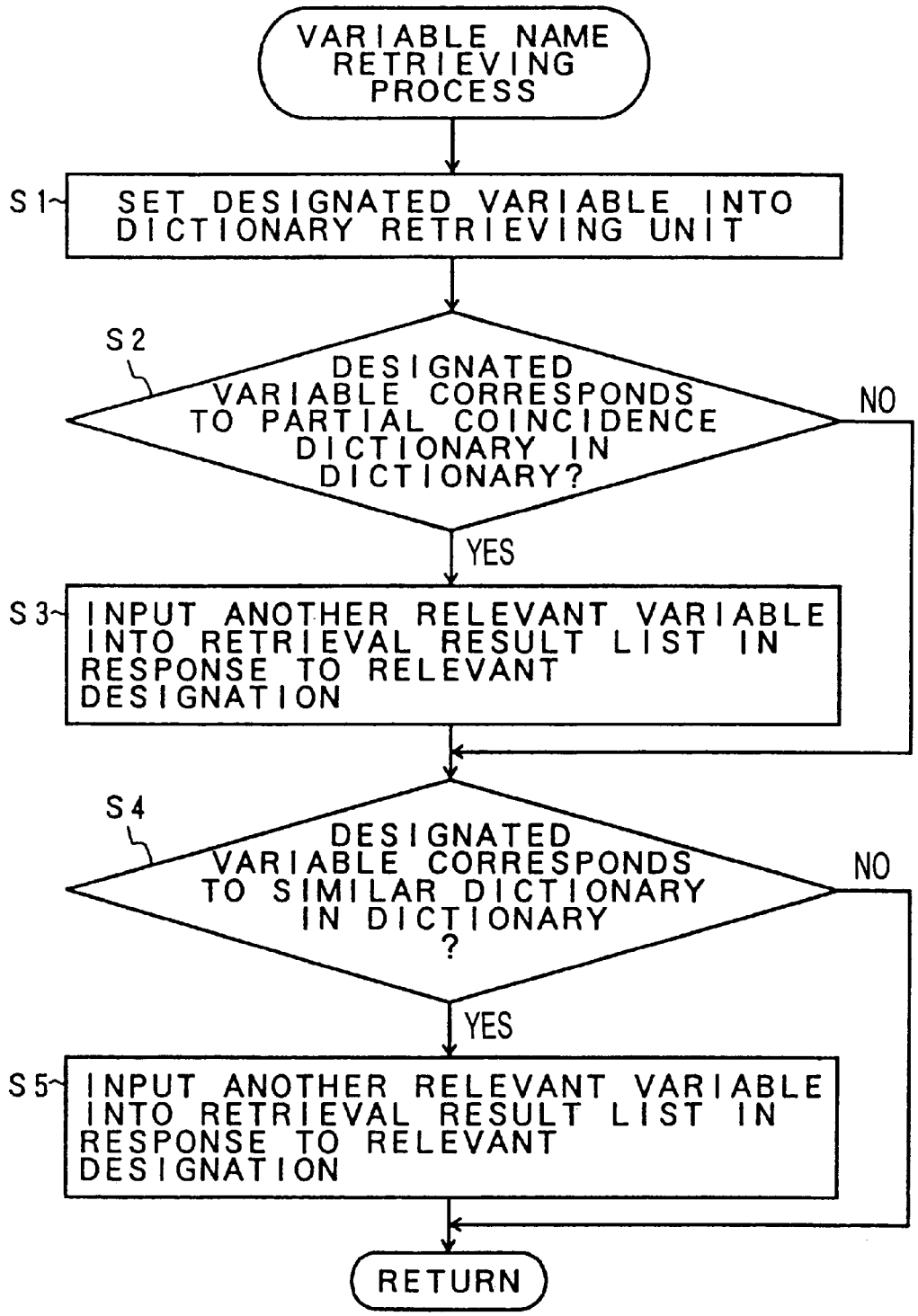
FIG. 21 is a flowchart for the variable name retrieving process using the dictionary of FIG. 20.

FIG. 21 shows the details of the variable name retrieving process in step S6 in FIG. 20. In the variable name retrieving process using the variable name dictionary, first in step S1, the variable designated by the user is set into a dictionary retrieving unit. In step S2, a check is made to see if it corresponds to the partial coincidence variable name dictionary 74 in the variable name dictionary 72. If YES, a variable serving as another relevant partial coincidence variable name stored in correspondence to the relevant designated variable is stored into the retrieval result list 28 in step S3. In step S4, a check is made to see if the variable designated by the user corresponds to the synonym designation of the similar variable name dictionary 76 in the variable name dictionary 72. If YES, the relevant similar variable name is stored as a retrieval result into the retrieval result list 28 in step S5. When the retrieval using the variable name dictionary in FIG. 21 is finished, the processing routine is returned to step S7 in FIG. 20 and the retrieval result list 28 is displayed to the user. The re-retrieval is repeated until the variable to be retrieved does not exist in step S8. By performing the retrieval using the variable name dictionary as mentioned above, the variable retrieval of a partially coincident variable and a similar variable which cannot be obtained by the syntax analysis of the source program can be certainly performed. A proper retrieval result can be obtained without overlooking the variable which directly relates to the designated variable.

Valid/Invalid of Variable Relation

Figure 22:
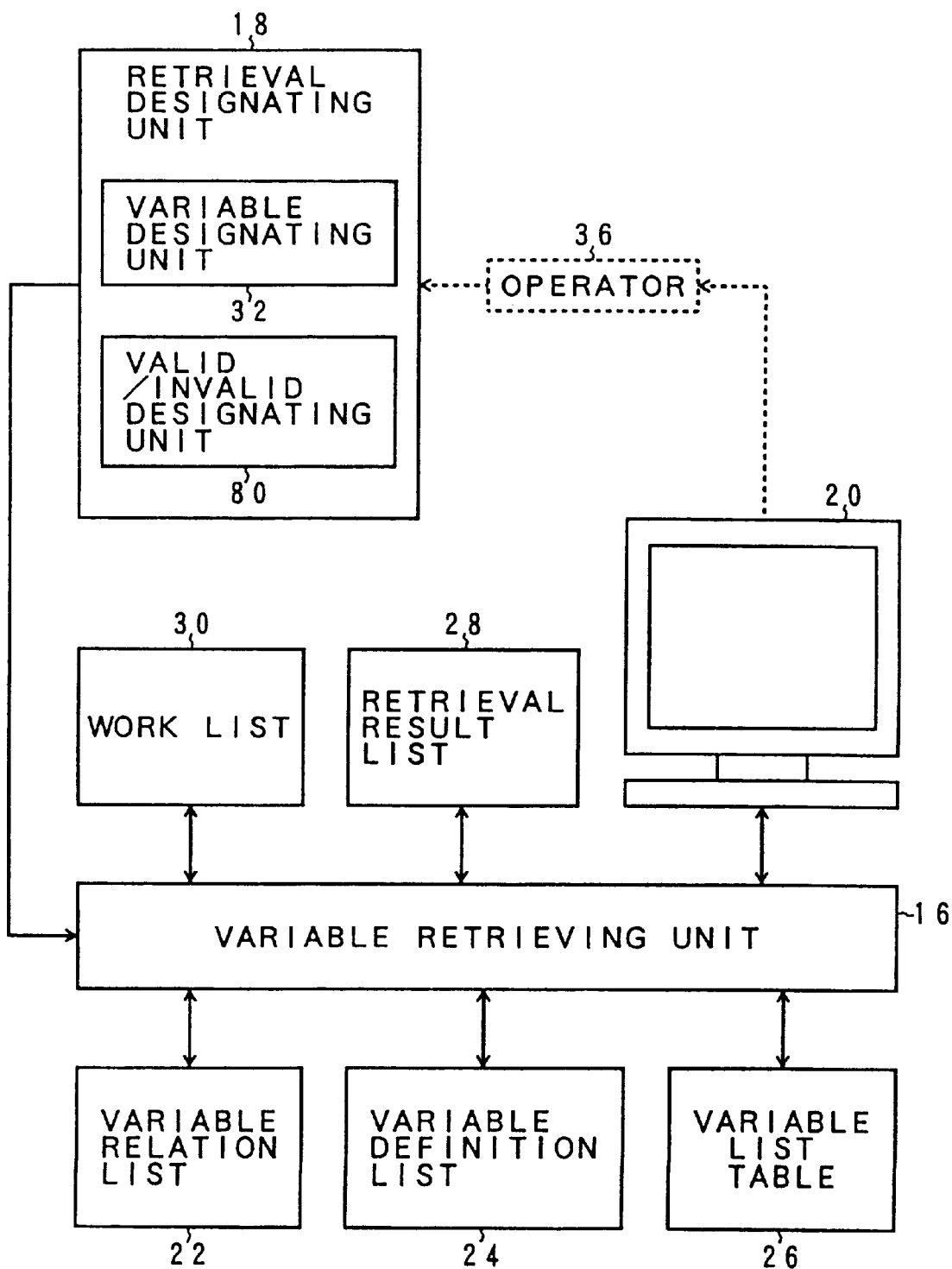
FIG. 22 is a functional block diagram of another embodiment of the invention which enables validity/invalidity of the variable relation information to be set.

FIG. 22 shows another embodiment of an interactive type variable retrieving apparatus. The embodiment is characterized in that the user can set validity and invalidity for the variable relation information as necessary. To set the validity and invalidity into the variable relation information, a valid/invalid setting unit 80 is provided for the retrieval designating unit 18. The operator 36 refers to the variable list table as a retrieval result displayed on the display unit 20 by the first variable designation, designates the variables which do not need to be retrieved any more in the variable list table, and can set, for example, invalidity into the corresponding variable relation information. When the operator sets the invalidity into the unnecessary variable relation information, the variable relation information is removed from the retrieval targets in the next retrieval. It is possible to prevent that the unnecessary retrieval result is obtained.

Figure 23:
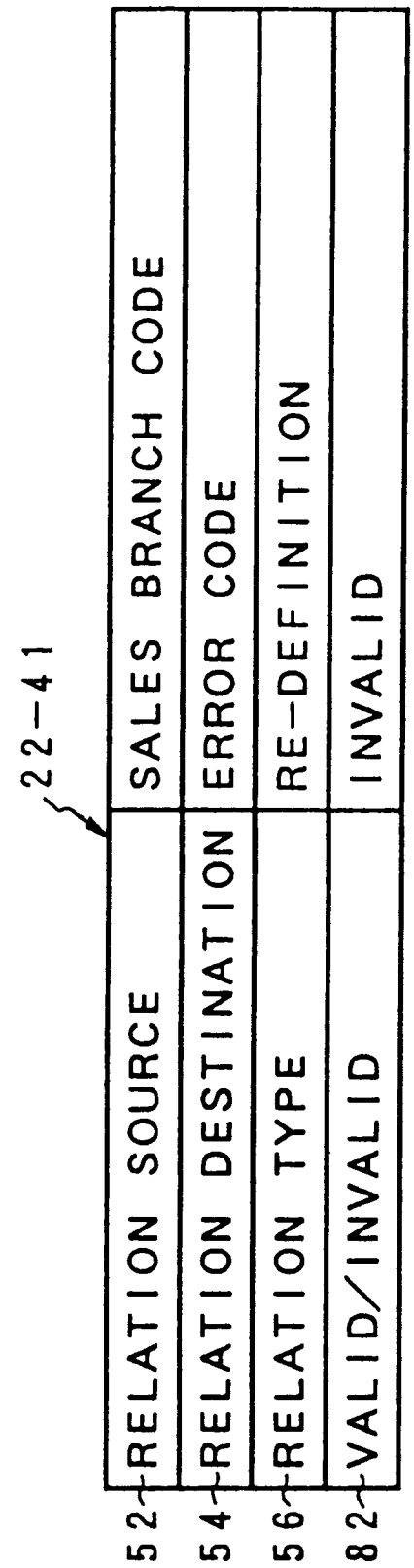
FIG. 23 is an explanatory diagram of the variable relation information which is used in FIG. 22 having a valid/invalid setting area.

FIG. 23 shows the variable relation information 22-41 having valid/invalid setting information by the valid/invalid setting unit 80 in FIG. 22. As for the variable relation information 22-41, in addition to the relation source 52, relation destination 54, and relation type 56, a valid/invalid setting area 82 is newly provided. In this case, invalid information is set.

Figure 24:
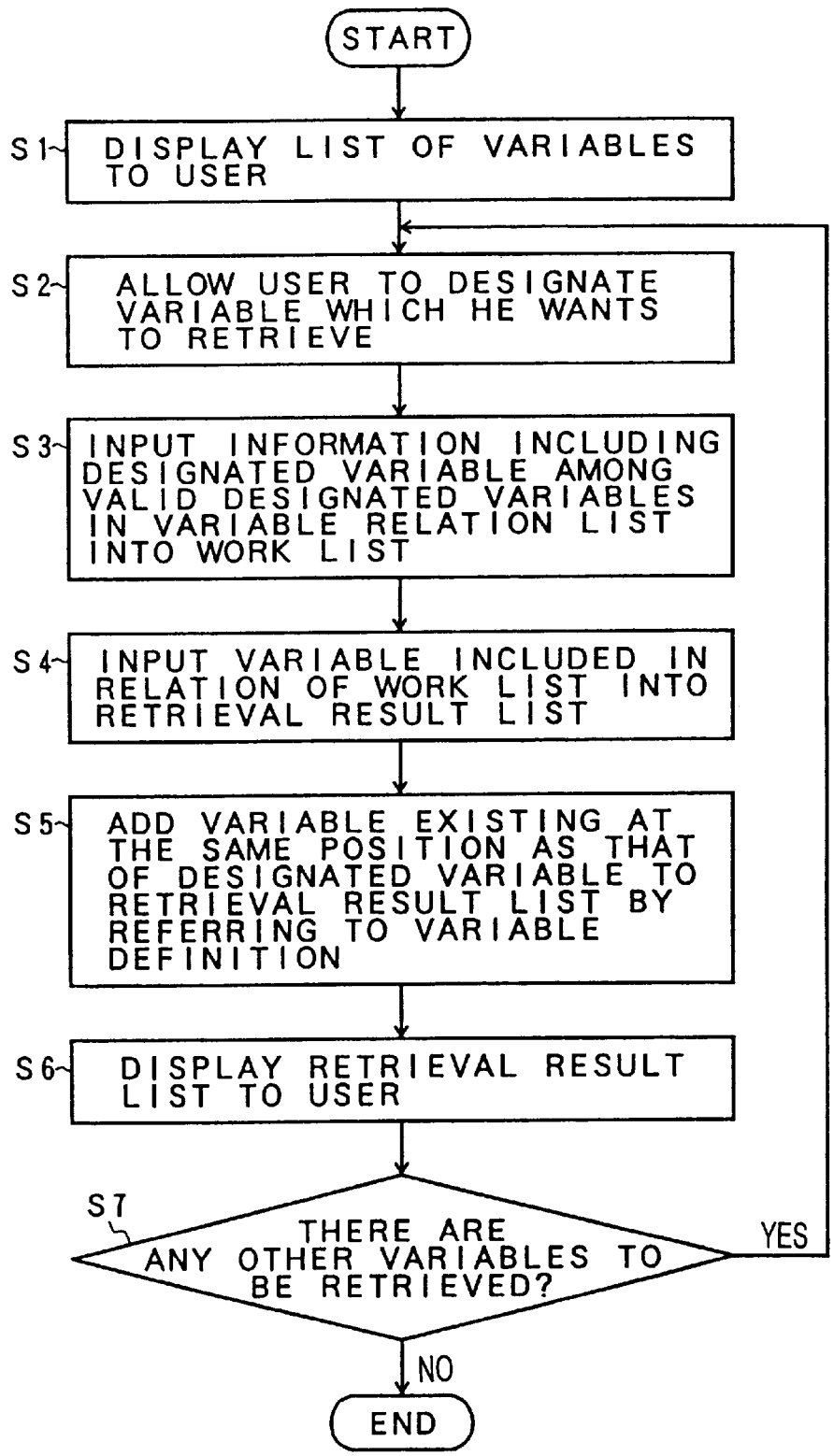
FIG. 24 is a flowchart for the variable retrieving process according to the embodiment of FIG. 22 which enables validity/invalidity of the variable relation information to be set.

FIG. 24 is a flowchart for a variable retrieving process having a valid/invalid setting function in FIG. 22. In the variable retrieving process, although the retrieving process in steps S1 to S7 is fundamentally the same as the process in FIG. 15, in step S3, information including the designated variable among the valid designated variables in the variable relation list is stored in the work list 30, so that the retrieval excluding the invalid designated variable relation information can be performed. As mentioned above, in the case where by designating the validity and invalidity by the operator 36 with respect to the variable relation information of the variables obtained as a retrieval result as necessary, the variable of another kind different from that of the variable which was first designated is obtained as a retrieval result during the repetition of the re-retrieval, by designating the invalidity with regard to such a different kind of variable, this variable can be removed from the retrieval target in the subsequent retrieval. Only the retrieval result of the variable which is directly related to the designated variable can be efficiently obtained.

Confidence Degree of the Variable Relation

Figure 25:
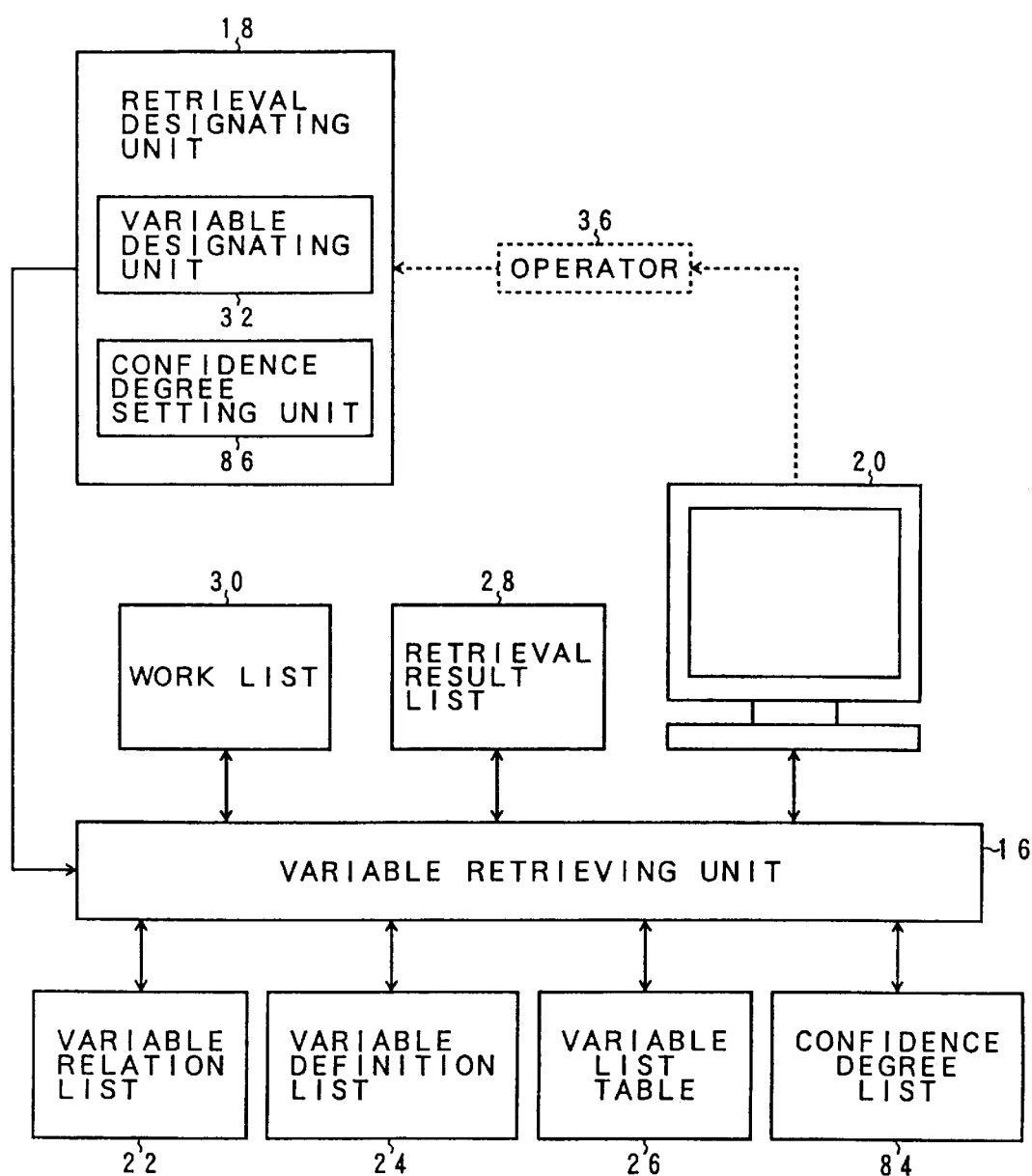
FIG. 25 is a functional block diagram of another embodiment of the invention in which confidence degrees are set into the variable relation information.

FIG. 25 shows another embodiment of an interactive type variable retrieving apparatus. The embodiment is characterized in that information of a confidence degree obtained by experience is set in accordance with the relation type of the variable relation information stored in the variable relation list 22 and the information of the confidence degree is added to the retrieval result and they are simultaneously displayed, thereby enabling the user to easily discriminate a confidence degree of the relation between the first designated variable and the retrieved variable. In order to add the confidence degree information of the variable relation to the retrieval result and to display them, a confidence degree list 84 is provided for the variable retrieving unit 16 and a confidence degree setting unit 86 to change the setting of the confidence degree as necessary is provided for the retrieval designating unit 18.

FIGS. 26A and 26B show a confidence degree list of FIG. 25 and variable relation information of the variable relation list 22 to which the confidence degree information was added. The confidence degree list 84 in FIG. 26A is constructed by a variable relation type 88 and a confidence degree 90. As variable relation types 88, for instance, there are five kinds of types of "master/slave relation", "re-definition", "transfer", "comparison", and "calculating equation". In correspondence to the variable relation types 88, "master/slave relation 70%", "re-definition 20%", "transfer 100%", "comparison 70%", and "calculating equation 50%" have been preset as confidence degrees 90 obtained by experience. By preparing the confidence degree list 84 in FIG. 26A as mentioned above, for example, like variable relation information 22-51 in FIG. 26B, in addition to the relation source 52, relation destination 54, and relation type 56, a confidence degree 90 is provided for the variable relation list 22 of the repository 14 obtained by the analysis of the source program 11 by the program syntax analyzing unit 12 in FIG. 4. As a value of the confidence degree 90, the confidence degree 70% of the master/slave relation obtained from the confidence degree list 84 in FIG. 16A is stored. Therefore, the confidence degree obtained from the relation type in variable relation information 22-51 as shown in, for example, FIG. 26B as a target of the retrieval is added to the variable in the retrieval result list 28 obtained by the variable retrieving unit 16 in FIG. 25. The value of the confidence degree is displayed on the display unit 20 together with the variable list table serving as a retrieval result. In the actual display screen, a list table of the variables as a retrieval result is displayed as shown in FIG. 15. In this state, when a specific variable is selected and the attribute display key 128 is mouse-clicked, the value of the confidence degree can be displayed. With respect to the variable obtained as a retrieval result as mentioned above, the user can see the confidence degree of the variable relation as necessary. Therefore, for example, when the confidence degree is low to be 20% like a re-definition of FIG. 26A, the source program is examined and whether there is a direct relation with the first designated variable or not is checked. On the other hand, when the confidence degree is high, since the relation with the designated variable is correct, it is sufficient to, for instance, correct the source program by relaying on the retrieval result as it is. In FIGS. 26A and 26B, although the confidence degree is expressed by a numerical value within a range from 0 to 100%, in place of such a numerical expression, the confidence degree can be also displayed by, for example, colors, symbols, or the like of three or five stages in accordance with the percentage numerical value of the confidence degree.

FIG. 27 shows another embodiment of an interactive type variable retrieving apparatus. The embodiment is characterized by having all of the functions in the embodiments of FIGS. 5, 18, 22, and further, 25. That is, the variable designating unit 32, a variable relation list forming unit 34, the variable name dictionary retrieving unit 78, the valid/invalid setting unit 80, and the confidence degree setting unit 86 are provided for the retrieval designating unit 18. The variable name dictionary 72 is also arranged. Further, the confidence degree list 84 is provided for the variable retrieving unit 16. By integrating such various functions, the retrieval of the variable which directly relates to the designated variable can be more properly executed by a powerful interactive function.

Automatic Variable Retrieval

Figure 28:
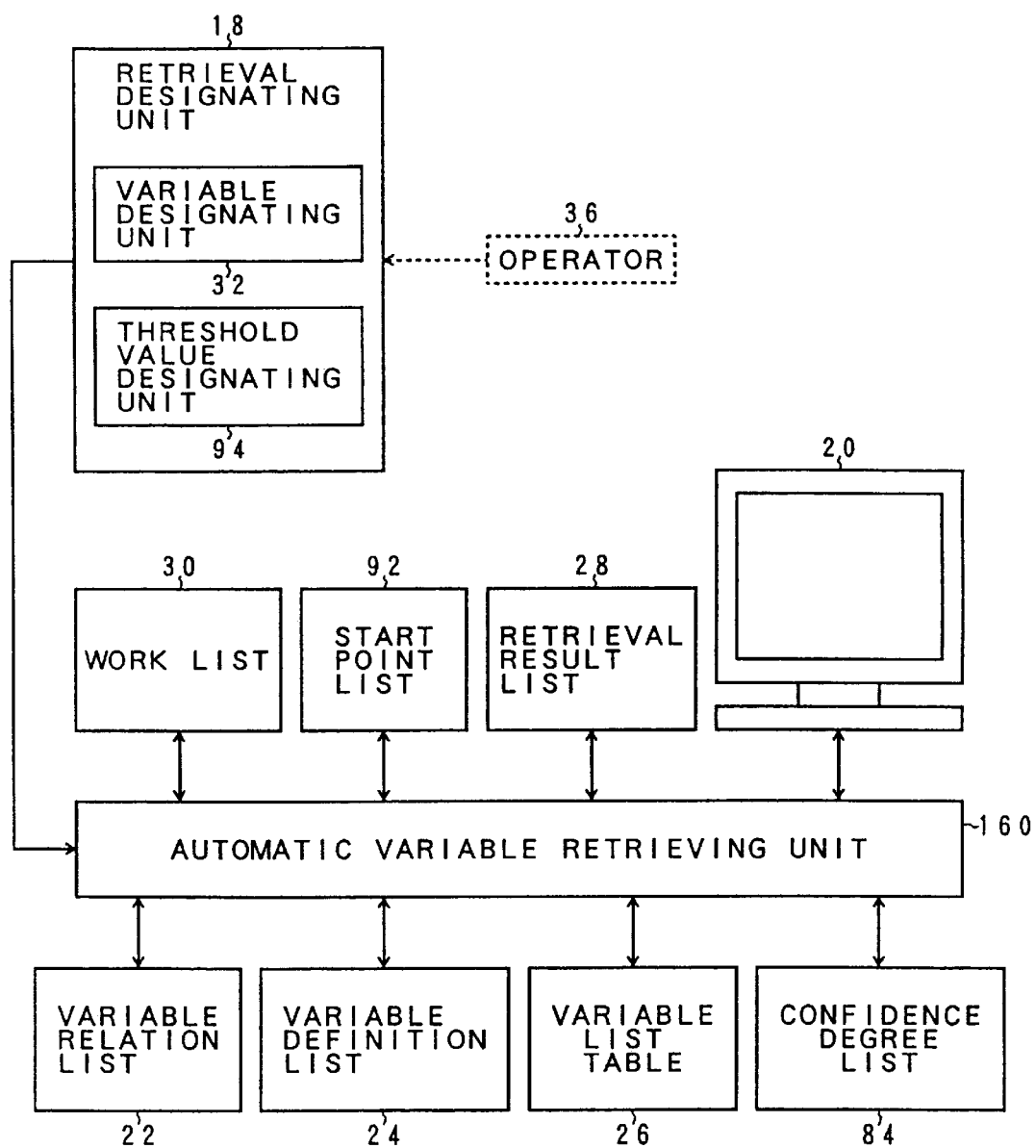
FIG. 28 is a functional block diagram of another embodiment of the invention for automatically retrieving a variable by limiting a retrieving range of the variable by an accumulation value of confidence degrees.

FIG. 28 shows another embodiment of a variable retrieving apparatus of the invention. The embodiment is characterized in that the retrieval by the interactive type with the user is not performed but when the user once designates the variable, the re-retrieval based on the retrieval result is automatically repeated, the variable regarding the designated variable is obtained, and a range of the automatic retrieval is limited on the basis of an accumulation value of the confidence degrees of the variable relation used in the embodiment of FIG. 25. Although the construction of the apparatus is substantially the same as that of FIG. 4, in the embodiment, an automatic variable retrieving unit 160 which does not need any interactive manner is provided for the interactive type variable retrieving unit 16. The designation of the variable as a retrieval target for the automatic variable retrieving unit 160 is executed by the retrieval designating unit 18. For this purpose, the variable designating unit 32 to designate the variable on the basis of the operation input of the operator 36 is provided for the retrieval designating unit 18. The variable relation list 22 and variable definition list 24 held in the repository 14 obtained as an analysis result of the program syntax analyzing unit 12 in FIG. 4 and the variable list table 26 are provided for the automatic variable retrieving unit 160. The confidence degree list 84 in which the confidence degrees that are used to control the retrieval range by the variable automatic retrieval have been stored is also provided. The confidence degree list 84 is the same as that in FIG. 26A. Further, in addition to the work list 30 and retrieval result list 28, a start point list 92 is provided for the automatic variable retrieving unit 160. Although a fundamental function of the automatic variable retrieving unit 160 is substantially the same as that of the conventional apparatus shown in FIG. 3, a limiting function of the retrieval range based on the accumulation value of the confidence degrees obtained from the confidence degree list 84 is newly provided for the automatic variable retrieving function which the conventional apparatus has.

Figure 29:
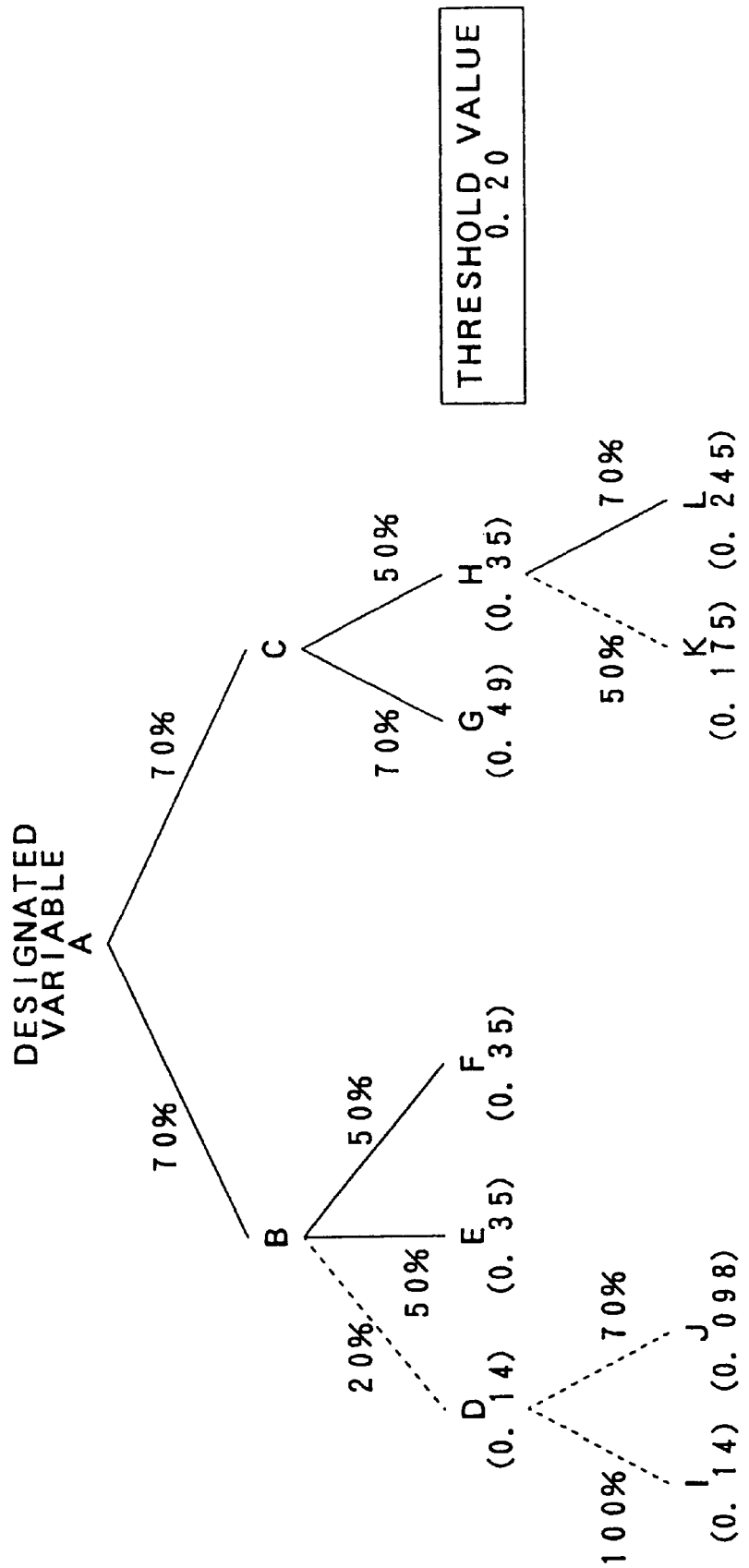
FIG. 29 is an explanatory diagram of a retrieval result and a confidence degree accumulation value in the variable automatic retrieval of FIG. 28.

FIG. 29 shows the repetition of the retrieval by the automatic variable retrieving unit 160 in FIG. 28 and an example of the confidence degrees of the variable relation in association with the repetition and the accumulation value of the confidence degrees. First, it is assumed that the user first designates, for example, a variable A and executes the retrieval of the first time, so that retrieval results of variables B and C are obtained. In this case, it is assumed that the confidence degree with respect to the relation between the variables A and B is equal to 70% and the confidence degree of the relation between the variables A and C is also equal to 70%. When the variables B and C are derived as a retrieval result of the first time as mentioned above, the retrieval is subsequently performed with regard to the variables B and C by automatically regarding them as new designated variables. Thus, it is assumed that as for the variable B, variables D, E, and F are obtained as variables which relate thereto and as for the variable C, variables G and H which relate thereto are obtained. Further, it is assumed that by again executing the automatic retrieval in the retrieval of the third time with respect to the variables D, E, F, G, and H, respectively, as for the variable D, variables I and J which relate thereto are obtained and, as for the variable H, variables K and L which relate thereto are obtained, respectively. In the present automatic retrieval, the re-retrieval is automatically repeated until the concerning variable is not finally obtained, so that an amount of retrieval results is extremely large and it is troublesome to confirm upon correction of the source program. In the embodiment of FIG. 28, therefore, since the confidence degree of the variable relation is obtained as shown by a percentage numerical value of a branch in FIG. 29 by the variable retrieval at each stage, 0 to 100% are set to decimals 0.0 to 1.0 and each time a new variable is retrieved, a multiplication value of the values of the confidence degrees so far is calculated as an accumulation value. In FIG. 29, an accumulation value derived by the multiplication of the confidence degree is shown by numerical values written in parentheses below each variable. The accumulation value of each of such variables shows a certainty of the variable relation for the designated variable A. As the accumulation value is smaller, the variable relation can be said to be more uncertain. In the embodiment of FIG. 28, therefore, a threshold value designating unit 94 is provided for the retrieval designating unit 18. A designated threshold value is compared with the accumulation value derived from the retrieval result. When the accumulation value is equal to or larger than the threshold value, the retrieval is continued. When the accumulation value is below the threshold value, the further retrieval is finished. For example, now assuming that "0.20" is designated as a threshold value in FIG. 29, for instance, in the system of the variables A, B, and D, the accumulation value in the retrieval result of the variable D is equal to $$0.7 \times 0.2 = 0.14$$

and is smaller than the threshold value 0.20. Therefore, the variable D is removed from the retrieval result list 28 and the variables I and J which relate to the variable D can be also removed from the retrieval result. As for the system of the variables A, C, H, and K, the accumulation value of the confidence degrees in the retrieval of the variable K is equal to $$0.7 \times 0.5 \times 0.5 = 0.175$$

and is smaller than the threshold value 0.20 and is removed from the retrieval result of the variable K. Therefore, the retrieval result for the designated variable A is limited to the variables B, C, E, F, G, H, and L shown by the system of a solid line. The retrieval result excluding the variables D, I, J, and K of a low accumulation value of the confidence degrees can be obtained. The retrieval range based on such an accumulation value of the confidence degrees can be easily widened or narrowed by setting a proper threshold value by the operator 36 through the threshold value designating unit 94. Since the retrieval range is narrowed by setting the threshold value, even if the re-retrieval is repeated, the time that is required for retrieval is short.

Figure 30A:
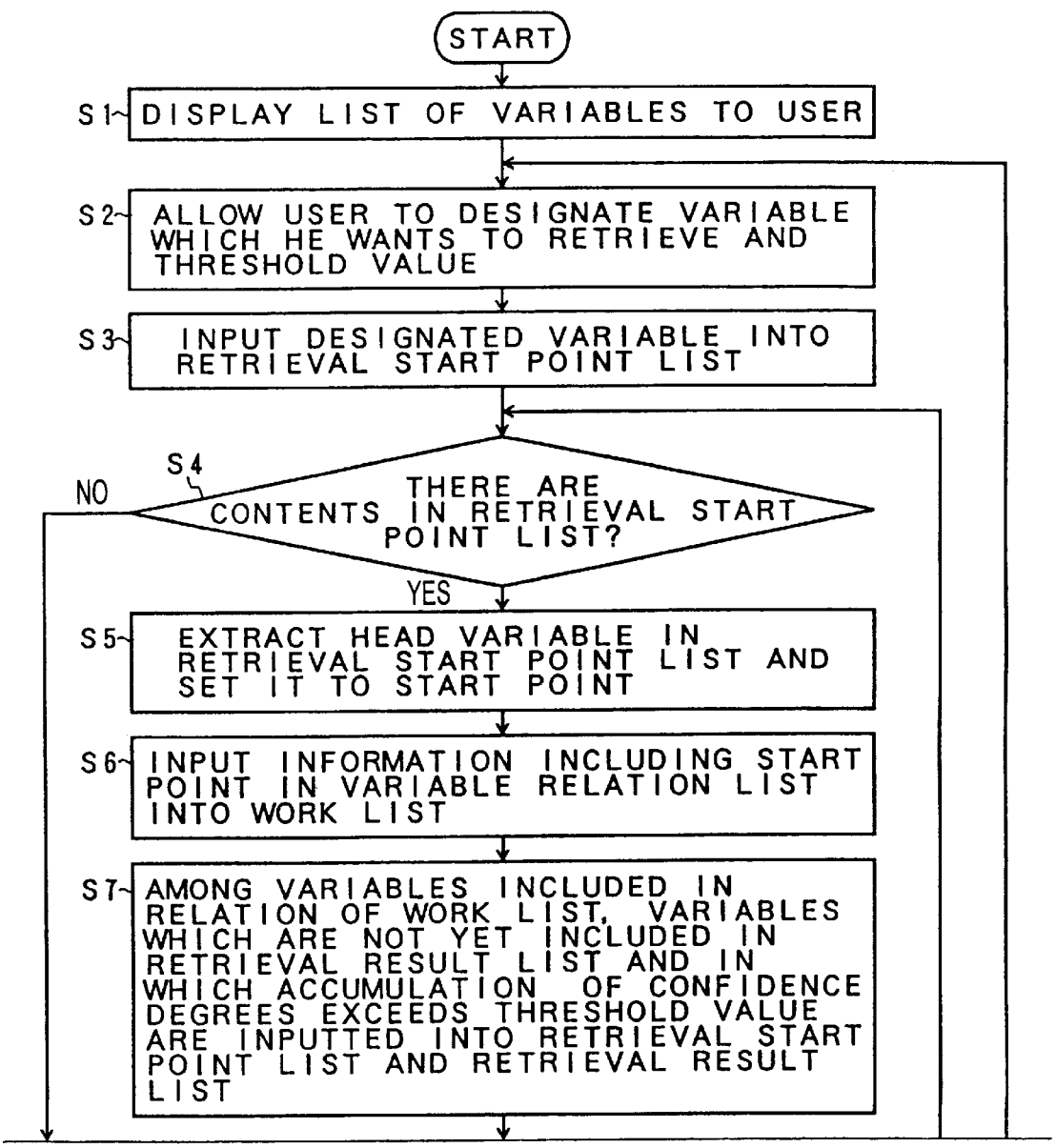

FIGS. 30A and 30B are flowcharts for the retrieving process of the embodiment in which the retrieval range is limited by the accumulation value of the confidence degrees in FIG. 28. First in step S1, the contents of the variable list table 26 are displayed to the operator 36. In step S2, the operator is allowed to designate a variable to be retrieved and a threshold value which is used for discrimination of the accumulation value of the confidence degrees. In step S3, the variable designated by the operator 36 is stored into the retrieval start point list 92. In step S4, a check is made to see if there are the contents in the retrieval start point list 92. If YES, a retrieving processes from step S5 are started. In step S5, the head variable in the retrieval start point list 92 is extracted and is set to a start point. In step S6, the variable relation list 22 is referred and variable relation information including the variable serving as a start point is stored into the work list 30. In step S7, among the variables which are not yet included in the retrieval result list 28 among the variables included in the variable relation information stored in the work list 30, the variables in which the accumulation value of the confidence degrees is larger than the threshold value designated in step S2 are stored into the retrieval start point list 92 and retrieval result list 28, respectively. In step S8, the variable definition list 24 is referred, the variable existing at the same position as that of the designated variable, specifically speaking, the variable designated by "REDIENES sentence" is obtained and the variables in which the accumulation value of the confidence degrees so far is larger than the threshold value among the variables which are not yet included in the retrieval result list 28 are stored into the retrieval start point list 92 and retrieval result list 28, respectively. By such a comparison between the accumulation value of the confidence degrees and the threshold value in steps S7 and S8, the variables in which the accumulation value of the confidence degrees is smaller than the threshold value are removed from the retrieval result. With respect to the series of the relations of the variables, the retrieval is finished at this point. When the process in step S8 is finished, the processing routine is returned to step S4. Processes in steps S5 to S8 are repeated until the contents in the retrieval start point list 92 do not exist. When the contents in the retrieval start point list 92 do not exist in step S4, step S9 follows and the contents of the retrieval result list 28 are displayed as a list table of the variables onto the display unit 20. In step S10, if there is further any variable to be retrieved with respect to the variable list table of the retrieval result displayed on the display unit 20, the processing routine is returned to step S2. The operator is allowed to designate a variable to be retrieved and a threshold value. If there is no variable to be retrieved, a series of processes is finished.

Further, the invention provides a recording medium in which a variable retrieving program to realize the variable retrieving function in the functional block diagrams of FIGS. 5, 18, 22, 25, and 27 or the automatic variable retrieving function in the functional block diagram of FIG. 28 has been stored. As an embodiment of the computer readable recording medium in which the variable retrieving program has been recorded, there is a removable portable storage medium such as CD-ROM, floppy disk, or the like, a storing apparatus of a program provider who supplies the program via a line, or further, a memory device such as RAM, hard disk, or the like of a processing apparatus in which the program has been installed. The variable retrieving program provided by the recording medium is loaded into a proper processing apparatus and is executed on a main memory.

According to the invention as mentioned above, since the retrieval of the related variables in case of designating a specific variable is executed step by step in an interactive manner with the user, even if the variable which is not related to the variable which was first designated as a retrieval result of the first time and whose contents are different is retrieved, the unrelated variable is removed at this time point and the proper retrieval can be continued. It is, consequently, possible to eliminate the conventional problem such that when the variable is once designated, all of the variables which directly or indirectly relate to the designated variable are automatically retrieved, so that the retrieval result amount is extremely large and it is difficult to confirm the variable relation upon correction of the source program.

Particularly, in case of retrieving the variables in an interactive manner according to the invention, since the variables which directly relate to the first designated variable are retrieved and displayed, the variable relation in the source program or the like can be also easily confirmed. A work amount regarding the correction of the source program based on the retrieval result is remarkably reduced. The source program can be efficiently corrected by using the retrieval result.

In the variable retrieving apparatus having the automatic variable retrieving function of the invention, the accumulation value of the confidence degrees obtained from the variable relation is obtained every retrieval and is compared with the preset threshold value. Only the variables in which the accumulation value is equal to or larger than the threshold value are set to the retrieval results. The variables in which the accumulation value is smaller than the threshold value are removed from the retrieval results. Thus, the variables in which the certainty is lower than the first designated variable and the relation is weak can be removed from the retrieving range. Even in the automatic retrieval, the retrieval result is not infinitely widened and the retrieval result in a proper range limited by the confidence degree showing the certainty of the variable relation can be automatically obtained.

Although the above embodiments have been described with respect to the example of the variable retrieval for correcting the source program, the invention is not limited to this example and can be applied as it is to a proper process using the variable relation in the program. The invention is not limited by the foregoing embodiments but incorporates many modifications within a scope of the invention without losing the objects and advantages of the invention. Further, the invention is not limited by the numerical values shown in the foregoing embodiments.

What is claimed is:

1. A variable retrieving apparatus of a computer program, comprising:

a syntax analyzing unit to analyze a syntax of a source program;

an analysis result storing unit to hold variable relation information showing relations among variables in the program obtained as an analysis result of said syntax analyzing unit, variable definition information of each of said variables, and a variable list table;

a retrieval designating unit to display said variable list table and allow the user to designate a variable as a retrieval target;

a variable retrieving unit to retrieve variables which directly relate to the variable designated by said retrieval designating unit with reference to said variable relation information and said variable definition information held in said analysis result storing unit; and a retrieval display unit to display a variable retrieval result obtained by said variable retrieving unit in a manner such that said variable retrieval result is displayed on a screen as a list table having a layer structure in correspondence to said source program in a format such that said variable retrieval result can be used for the designation for a re-retrieval by said retrieval designating unit and said retrieval designating unit is allowed to execute the variable designation for the re-retrieval by selecting an arbitrary variable in said list table on the screen.

2. An apparatus according to claim 1, wherein said variable retrieving unit retrieves variables including said designated variable in either a relation source or a relation destination with reference to said variable relation information, stores retrieved variables into the retrieval result, retrieves a variable existing at a same position as that of said designated variable with reference to said variable definition information, and stores retrieved variables into the retrieval result.

3. An apparatus according to claim 1, further comprising:
a variable name dictionary in which relations among variable names have previously been registered; and
a variable name dictionary retrieving unit to retrieve the variables which directly relate to the designated variable with reference to said variable name dictionary by the designated variable by said retrieval designating unit and storing said retrieved variables into said retrieval result.

4. An apparatus according to claim 3, wherein
said variable name dictionary has: a partial coincidence variable name dictionary in which partial coincidence variables each of which partially coincides with the variable name have been registered; and a similar variable name dictionary in which variable names similar to the variable name have been registered, and
said variable name dictionary retrieving unit retrieves variable names each of which partially coincides with or is similar to said designated variable name with reference to said partial coincidence variable name dictionary and said similar variable name dictionary by the designated variable and stores retrieved variable names into the retrieval result.

5. An apparatus according to claim 1, wherein said retrieval designating unit has a variable relation information forming unit to form variable relation information showing the relations among the variables by an inputting operation and holding as variable relation information of said analysis result storing unit.

6. An apparatus according to claim 1, wherein said retrieval designating unit has a valid/invalid designating unit to designate validity and invalidity of a variable relation as a retrieval target for the list table of the variable retrieval result displayed on said display unit as a target, and said variable retrieving unit removes a variable relation designated to be invalid by said valid/invalid designating unit from retrieval targets.

7. An apparatus according to claim 1, wherein said analysis result storing unit holds line information of said source program which becomes a reason of said variable relation into said variable relation information formed by a program analysis by said syntax analyzing unit and allows said display unit to display said line information together with the retrieval result.

8. An apparatus according to claim 1, wherein when an arbitrary variable is selected on the source program displayed on a screen for the purpose of a correcting operation of the source program, said display unit displays positions of variables which directly relate to the selected variable onto the source program on the basis of line information of said source program added to said variable retrieval result.

9. An apparatus according to claim 1, wherein confidence degree information indicative of information of confidence degrees of relation kinds included in the variable relation information stored in said analysis result storing unit is further registered, said retrieving unit stores the confidence degree obtained with reference to said confidence degree information into the retrieval result in addition to the retrieved variable, and said display unit displays the confidence degree together with the retrieval result.

10. An apparatus according to claim 9, wherein said retrieval designating unit has a confidence degree setting unit to individually change a setting of the confidence degree displayed by said display unit together with the retrieval result in accordance with an operation input.

11. A variable retrieving apparatus of a computer program, comprising:
a syntax analyzing unit to analyze a syntax of source program;
an analysis result storing unit to hold variable relation information showing relations among variables in the program obtained as an analysis result of said syntax analyzing unit and variable definition information;
a retrieval designating unit to designate a variable as a retrieval target on the basis of an operation input;
a variable retrieving unit to refer to said variable relation information and said variable definition information held in said analysis result storing unit, to retrieve variables which directly relate to a designation variable designated by the operation input to said retrieval designating unit, to further regard the variable obtained as a retrieval result as a designated variable, to retrieve variables which indirectly relate to said designated variable, to accumulate confidence degrees of relation kinds of the variables every retrieval of each of said variables, to remove the variable from the retrieval result in the case where an accumulation value of said confidence degrees is less than a predetermined threshold value, and to store the variable into the retrieval result in the case where said accumulation value is equal to or larger than said threshold value; and
a display unit to display a variable retrieval result by said variable retrieving unit.

12. An apparatus according to claim 11, wherein said variable retrieving unit multiplies confidence degrees of the relation kinds of the variables which are expressed by numerical values within a range from 1.0 to 0 every retrieval of each of said variables, removes the variable from the retrieval result in the case where a value of said multiplication is less than a predetermined threshold value, and stores the variable into the retrieval result in the case where said multiplication value is equal to or larger than said threshold value.

13. A variable retrieving method of a computer program, comprising:
a syntax analyzing step of analyzing a syntax of a source program;
an analysis result storing step of holding variable relation information showing relations among variables in the program obtained as an analysis result of said syntax analyzing step, variable definition information, and a variable list table;
a retrieval designating step of displaying said variable list table and allowing the user to designate a variable as a retrieval target;
a variable retrieving step of retrieving variables which directly relate to the variable designated by said retrieval designating step with reference to said variable relation information and said variable definition information held in said analysis result storing step; and
a retrieval displaying step of displaying a variable retrieval result obtained by said variable retrieving step in a manner such that said variable retrieval result is displayed on a screen as a list table having a layer structure in correspondence to said source program in a format such that said variable retrieval result can be used for the designation for a re-retrieval by said retrieval designating step and said retrieval designating step is allowed to execute the variable designation for the re-retrieval by selecting an arbitrary variable in said list table on the screen.

14. A method according to claim 13, wherein in said variable retrieving step, variables including said designated variable in either a relation source or a relation destination are retrieved with reference to said variable relation information and are stored into the retrieval result, and a variable existing at a same position as that of said designated variable is retrieved with reference to said variable definition information and is stored into the retrieval result.

15. A method according to claim 13, further comprising:
a dictionary registering step of previously registering relations among variable names into a variable name dictionary; and
a variable name dictionary retrieving step of retrieving the variables which directly relate to the designated variable with reference to said variable name dictionary by the designated variable by said retrieval designating step and storing the retrieved variables into said retrieval result.

16. A method according to claim 15, wherein
said variable name dictionary has: a partial coincidence variable name dictionary in which partial coincidence variables each of which partially coincides with the variable name have been registered; and a similar variable name dictionary in which variable names similar to the variable name have been registered, and
said variable name dictionary retrieving step has; variable names each of which partially coincides with or is similar to said designated variable name with reference to said partial coincidence variable name dictionary and said similar variable name dictionary by the designated variable are retrieved and are stored into the retrieval result.

17. A method according to claim 13, wherein said retrieval designating step has a variable relation information forming step of forming variable relation information showing the relations among the variables by an inputting operation and holding as variable relation information of said analysis result storing step.

18. A method according to claim 13, wherein said retrieval designating step has a valid/invalid designating step of designating validity and invalidity of a variable relation as a retrieval target for the list table of the variable retrieval result displayed in said displaying step as a target, and in said variable retrieving step, a variable relation designated to be invalid by said valid/invalid designating step is removed from retrieval targets.

19. A method according to claim 3, wherein in said analysis result storing step, line information of said source program which becomes a reason of said variable relation is held in said variable relation information formed by a program analysis by said syntax analyzing step, and said line information is displayed together with the retrieval result by said displaying step.

20. A method according to claim 13, wherein in said displaying step, when an arbitrary variable is selected on the source program displayed on a screen for the purpose of a correcting operation of the source program, positions of variables which directly relate to the selected variable are displayed on the source program on the basis of line information of said source program added to said variable retrieval result.

21. A method according to claim 13, wherein confidence degree information indicative of confidence degrees of relation kinds included in the variable relation information stored in said analysis result storing step is further registered, and in said retrieving step, the confidence degree obtained with reference to said confidence degree information is stored into the retrieval result in addition to the retrieved variable, and in said displaying step, the confidence degree is displayed together with the retrieval result.

22. A method according to claim 21, wherein said retrieval designating step has a confidence degree setting step of individually changing a setting of the confidence degree displayed by said displaying step together with the retrieval result in accordance with an operation input.

23. A variable retrieving method of a computer program, comprising:
a syntax analyzing step of analyzing a syntax of a source program;
an analysis result storing step of holding variable relation information showing relations among variables in the program obtained as an analysis result of said syntax analyzing step and variable definition information;
a retrieval designating step of designating a variable as a retrieval target on the basis of an operation input;
a variable retrieving step of referring to said variable relation information and said variable definition information held in said analysis result storing step, retrieving variables which directly relate to a designation variable designated by the operation input to said retrieval designating step, further regarding the variable obtained as a retrieval result as a designated variable, retrieving variables which indirectly relate to said designated variable, accumulating confidence degrees of relation kinds of the variables every retrieval of each of said variables, removing the variable from the retrieval result in the case where an accumulation value of said confidence degrees is less than a predetermined threshold value, and storing the variable into the retrieval result in the case where said accumulation value is equal to or larger than said threshold value; and
a retrieval displaying step of displaying a variable retrieval result by said variable retrieving step.

24. A method according to claim 23, wherein in said variable retrieving step, confidence degrees of the relation kinds of the variables which are expressed by numerical values within a range from 1.0 to 0 are multiplied every retrieval of each of said variables, the variable is removed from the retrieval result in the case where a value of said multiplication is less than a predetermined threshold value, and the variable is stored into the retrieval result in the case where said multiplication value is equal to or larger than said threshold value.

25. A computer readable recording medium on which a variable retrieving program has been recorded, wherein said program comprises:
a syntax analyzing module for analyzing a syntax of a source program;
an analysis result storing module to hold variable relation information showing relations among variables in the program obtained as an analysis result of said syntax analyzing module, variable definition information of each of said variables, and a variable list table;
a retrieval designating module to display said variable list table and allow the user to designate a variable as a retrieval target;

a variable retrieving module to retrieve variables which directly relate to the variable designated by said retrieval designating module with reference to variable relation information showing relations among variables in a program obtained as a result of a syntax analysis of a source program and variable definition information; and a retrieval displaying module to display a variable retrieval result obtained by said variable retrieving module in a manner such that said variable retrieval result is displayed on a screen as a list table having a layer structure in correspondence to said source program in a format such that said variable retrieval result can be used for the designation for a re-retrieval by said retrieval designating module and said retrieval designating module is allowed to execute the variable designation for the re-retrieval by selecting an arbitrary variable in said list table on the screen.

26. A computer readable recording medium on which a variable retrieving program has been recorded, wherein said program comprises:

a retrieval designating module to designate a variable as a retrieval target on the basis of an operation input;

a variable retrieving module to refer to variable relation information and variable definition information held in an analysis result storing module, to refer to said variable relation information showing relations among variables in a program obtained as a result of a syntax analysis of a source program and said variable definition information, to retrieve variables which directly relate to the designation variable designated by the operation input to said retrieval designating module, to further regard the variable obtained as a retrieval result as a designated variable, to retrieve variables which indirectly relate to said designated variable, to accumulate confidence degrees of relation kinds of the variables every retrieval of each of said variables, to remove the variables from the retrieval result in the case where an accumulation value of said confidence degrees is less than a predetermined threshold value, and to store the variables into the retrieval result in the case where said accumulation value is equal to or larger than said threshold value; and a displaying module to display a variable retrieval result by said variable retrieving module.

* * * * *